US009782673B2

(12) United States Patent
Takagi et al.

(10) Patent No.: US 9,782,673 B2
(45) Date of Patent: Oct. 10, 2017

(54) TERMINAL DISPLAY CONTROL METHOD, TERMINAL DISPLAY SYSTEM AND SERVER APPARATUS

(71) Applicant: GREE, Inc., Minato-ku (JP)

(72) Inventors: Yushi Takagi, Tokyo (JP); Toshiharu Yabe, Tokyo (JP); Kenji Iguchi, Tokyo (JP); Takuya Kai, Tokyo (JP)

(73) Assignee: GREE, Inc., Minato-ku (JP)

( * ) Notice: Subject to any disclaimer, the term of this patent is extended or adjusted under 35 U.S.C. 154(b) by 93 days.

(21) Appl. No.: 14/167,290

(22) Filed: Jan. 29, 2014

(65) Prior Publication Data

US 2014/0213360 A1 Jul. 31, 2014

(30) Foreign Application Priority Data

Jan. 31, 2013 (JP) .................................. 2013-017770

(51) Int. Cl.
- *A63F 9/00* (2006.01)
- *A63F 13/323* (2014.01)
- *A63F 13/26* (2014.01)
- *A63F 13/355* (2014.01)
- *A63F 13/426* (2014.01)

(Continued)

(52) U.S. Cl.
CPC ........ *A63F 13/323* (2014.09); *A63F 13/2145* (2014.09); *A63F 13/26* (2014.09); *A63F 13/327* (2014.09); *A63F 13/355* (2014.09); *A63F 13/426* (2014.09); *A63F 13/843* (2014.09)

(58) Field of Classification Search
None
See application file for complete search history.

(56) References Cited

U.S. PATENT DOCUMENTS

| 7,115,031 B2 * | 10/2006 | Miyamoto | .............. | A63F 13/06 |
| | | | | 273/148 B |
| 2002/0097229 A1 * | 7/2002 | Rose | ..................... | G06F 1/1626 |
| | | | | 345/173 |

(Continued)

FOREIGN PATENT DOCUMENTS

| JP | 6-285259 | 10/1994 |
| JP | 2003-135845 | 5/2003 |

(Continued)

OTHER PUBLICATIONS

Japanese Office Action issued Feb. 12, 2014, in Japan Patent Application No. 2013-017770 (with English translation).

(Continued)

*Primary Examiner* — Seng H Lim
(74) *Attorney, Agent, or Firm* — Oblon, McClelland, Maier & Neustadt, L.L.P.

(57) ABSTRACT

According to one embodiment, a terminal display control method for using as a controller of a game a terminal device including a touch panel, which is configured to be integral with a display, includes selecting a controller image which is used in the game; setting at least one of a presence/absence of a function, a number, a size, a shape and a position of disposition, with respect to an operation element in the controller image; and making variable, in accordance with a content of the setting, a state of the controller image displayed on the display, and an operation standard of the operation element corresponding to an input on the touch panel.

22 Claims, 15 Drawing Sheets

(51) Int. Cl.
*A63F 13/843* (2014.01)
*A63F 13/2145* (2014.01)
*A63F 13/327* (2014.01)

(56) References Cited

U.S. PATENT DOCUMENTS

| | | | | |
|---|---|---|---|---|
| 2002/0191029 A1* | 12/2002 | Gillespie | ............... | G06F 3/0488 715/810 |
| 2005/0176502 A1* | 8/2005 | Nishimura | ............... | A63F 13/10 463/31 |
| 2005/0227762 A1* | 10/2005 | Tahara | ............... | A63F 13/10 463/30 |
| 2008/0305873 A1* | 12/2008 | Zheng | ............... | A63F 13/06 463/37 |
| 2010/0041480 A1* | 2/2010 | Wong | ............... | A63F 13/06 463/37 |
| 2010/0141611 A1* | 6/2010 | Lee | ............... | G06F 3/033 345/184 |
| 2010/0245277 A1* | 9/2010 | Nakao | ............... | G06F 3/04883 345/173 |
| 2010/0279769 A1* | 11/2010 | Kidakam | ............... | A63F 13/06 463/31 |
| 2011/0009195 A1* | 1/2011 | Porwal | ............... | A63F 13/06 463/37 |
| 2011/0022393 A1* | 1/2011 | Waller | ............... | G01C 21/3608 704/270 |
| 2011/0172013 A1* | 7/2011 | Shirasaka | ............... | G06F 3/0488 463/37 |
| 2011/0181529 A1* | 7/2011 | Capela | ............... | G06F 3/0488 345/173 |
| 2011/0191516 A1* | 8/2011 | Xiong | ............... | G06F 13/14 710/305 |
| 2011/0300934 A1* | 12/2011 | Toy | ............... | A63F 13/10 463/31 |
| 2012/0034978 A1* | 2/2012 | Lim | ............... | A63F 13/06 463/36 |
| 2012/0044177 A1* | 2/2012 | Ohta | ............... | A63F 13/06 345/173 |
| 2012/0058825 A1* | 3/2012 | Takehiro | ............... | A63F 13/10 463/37 |
| 2012/0169610 A1* | 7/2012 | Berkes | ............... | G06F 3/04883 345/173 |
| 2012/0242590 A1* | 9/2012 | Baccichet | ............... | G06F 3/0488 345/173 |
| 2013/0038623 A1* | 2/2013 | Tezuka | ............... | G06F 3/04886 345/589 |
| 2013/0217498 A1* | 8/2013 | Wang | ............... | A63F 13/06 463/37 |
| 2013/0303281 A1* | 11/2013 | Argiro | ............... | A63F 13/02 3/2 |
| 2015/0182856 A1* | 7/2015 | Mays, III | ............... | A63F 13/2145 463/31 |

FOREIGN PATENT DOCUMENTS

| | | |
|---|---|---|
| JP | 2006-102210 A | 4/2006 |
| JP | 2008-018013 A | 1/2008 |
| JP | 2009-53781 A | 3/2009 |
| JP | 2010-264171 A | 11/2010 |
| JP | 2011-141632 | 7/2011 |
| JP | 2012-113725 A | 6/2012 |
| WO | 2011/096203 A1 | 8/2011 |

OTHER PUBLICATIONS

Office Action issued Aug. 25, 2015 in Japanese Patent Application No. 2013-017770 (with English language translation).
Office Action issued Jan. 10, 2017 in Japanese Patent Application No. 2015-229890 (with English Translation).
Office Action issued Jul. 25, 2017 in Japanese Patent Application No. 2015-229890 (with computer generated English translation).

* cited by examiner

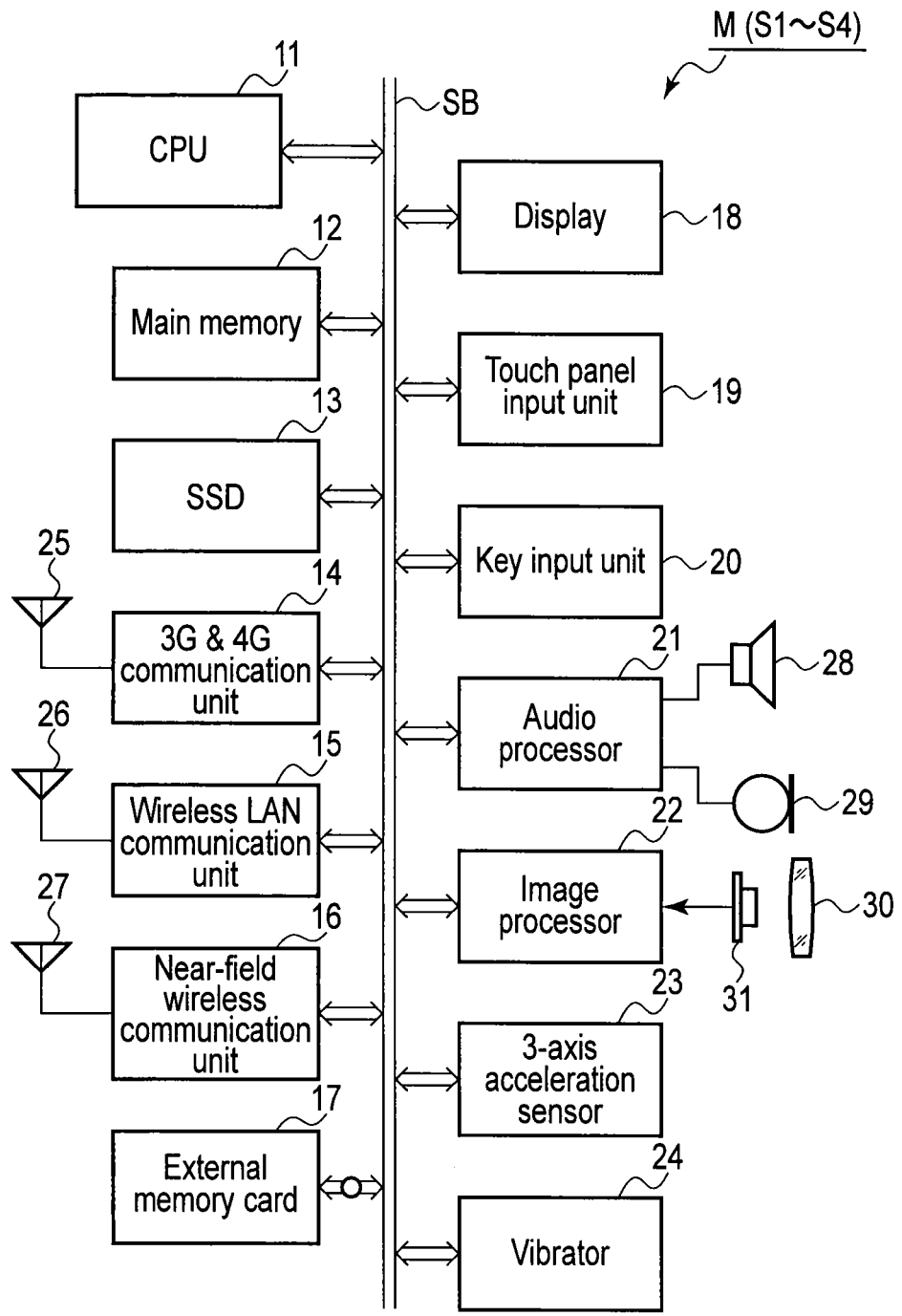
F I G. 2

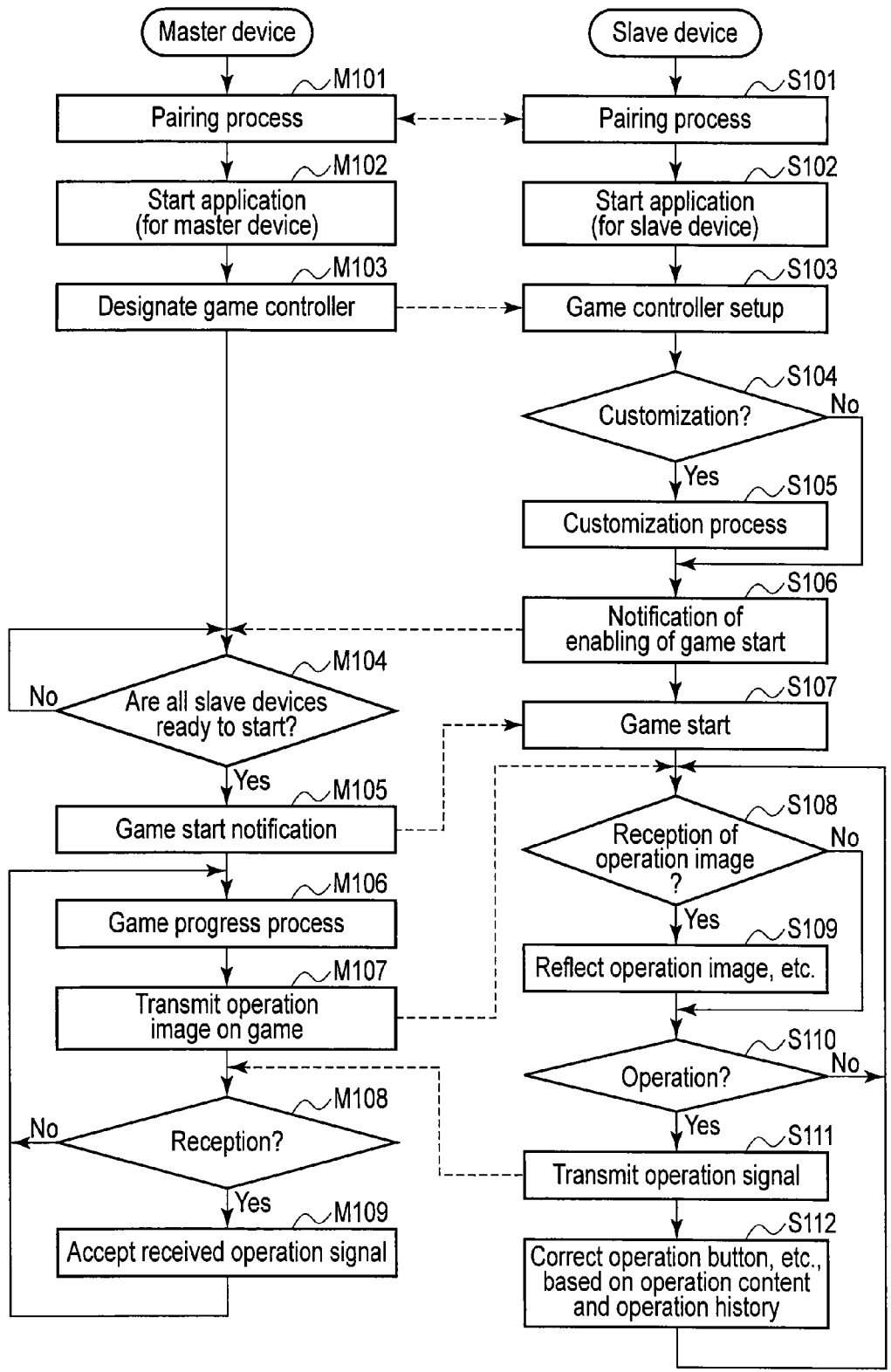
F I G. 3

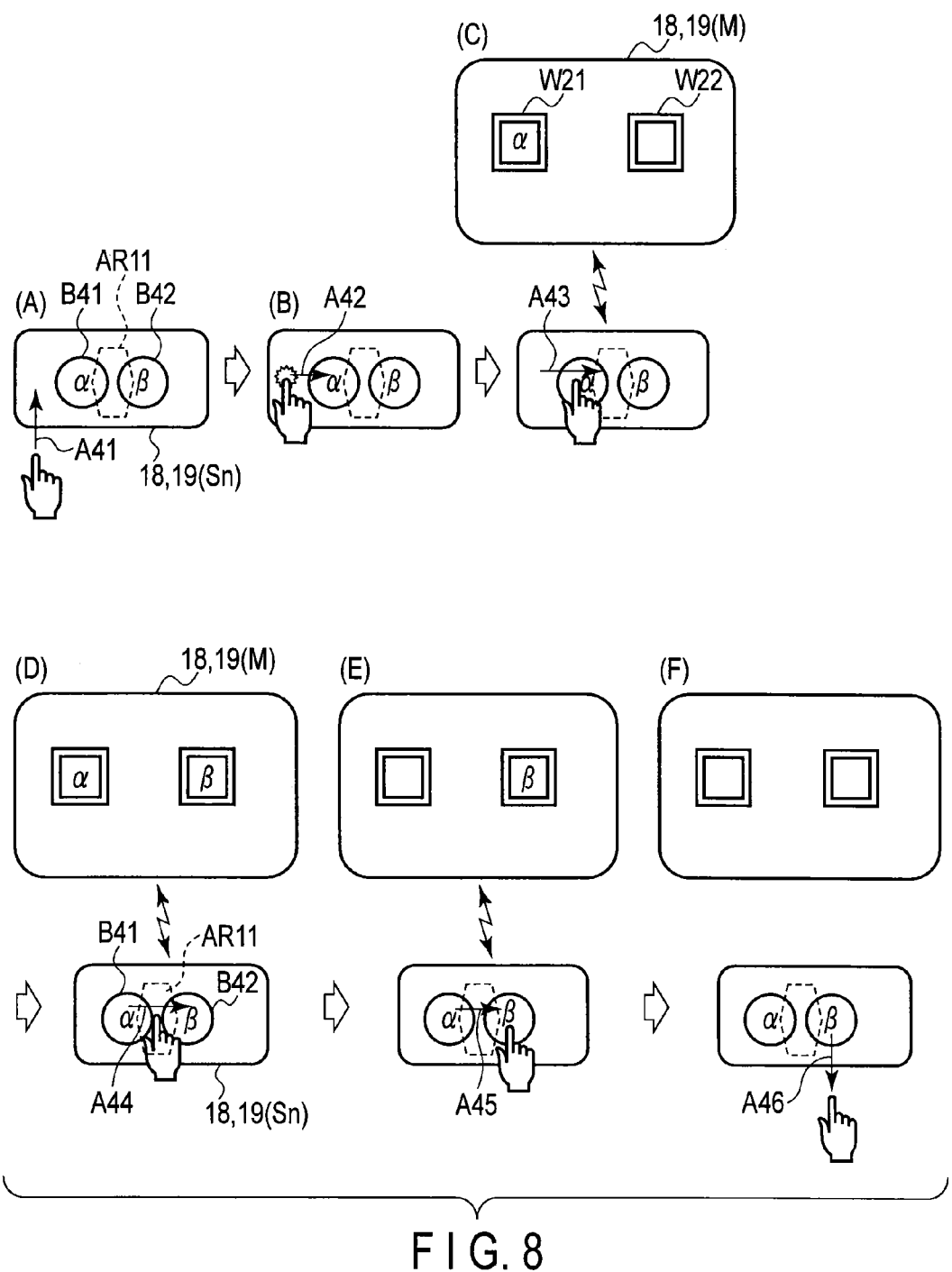
F I G. 8

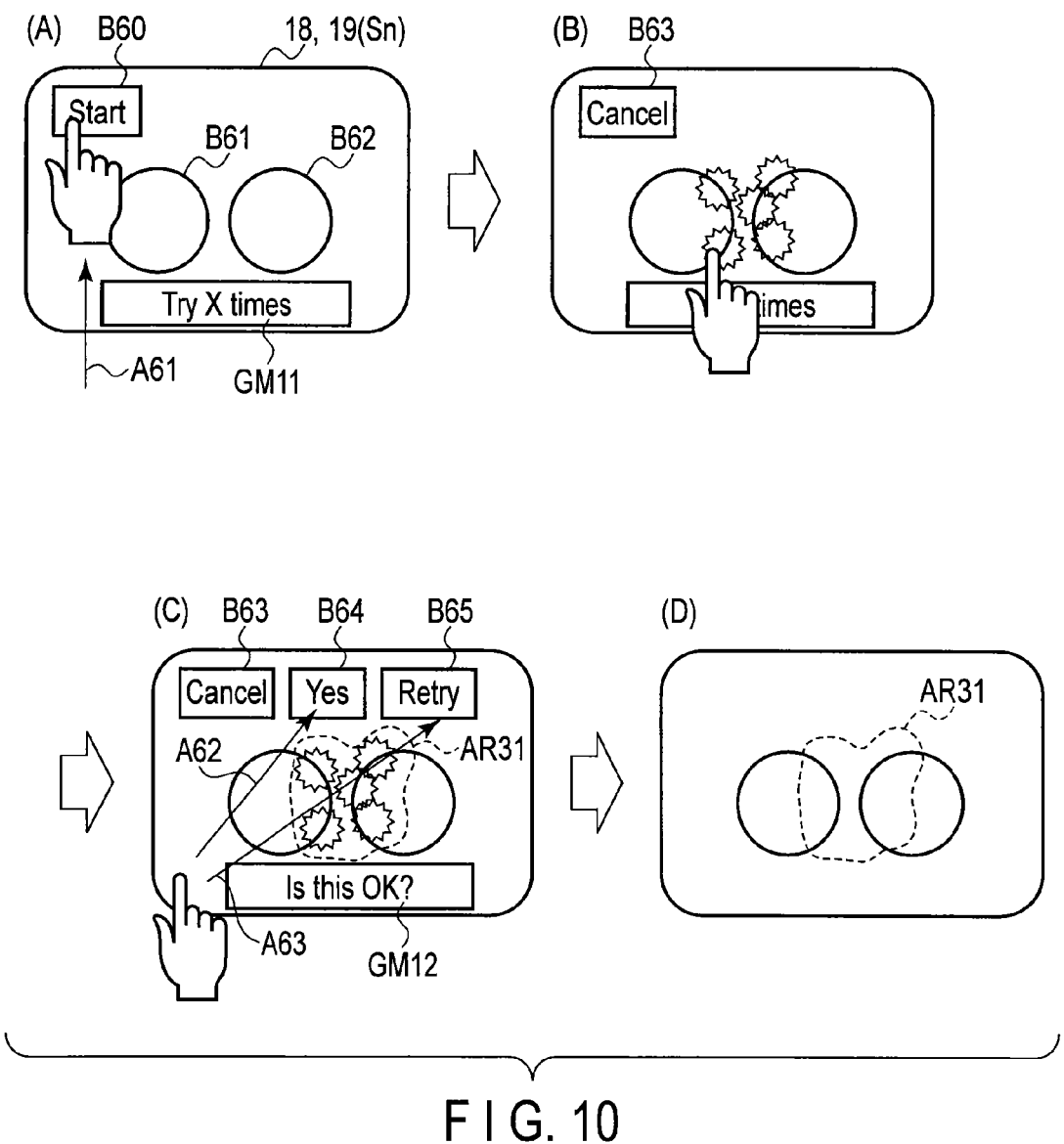
F I G. 10

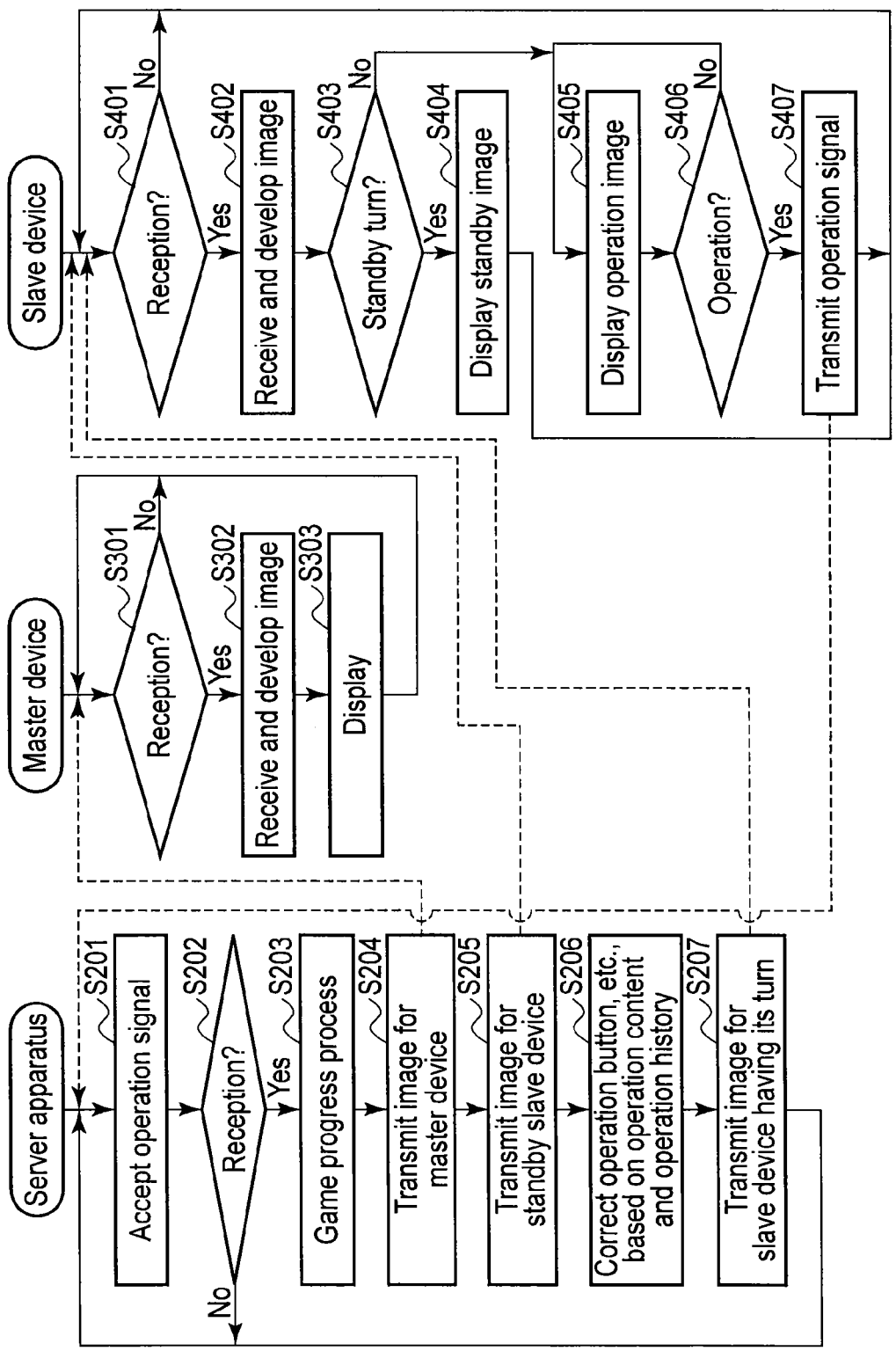
F I G. 14

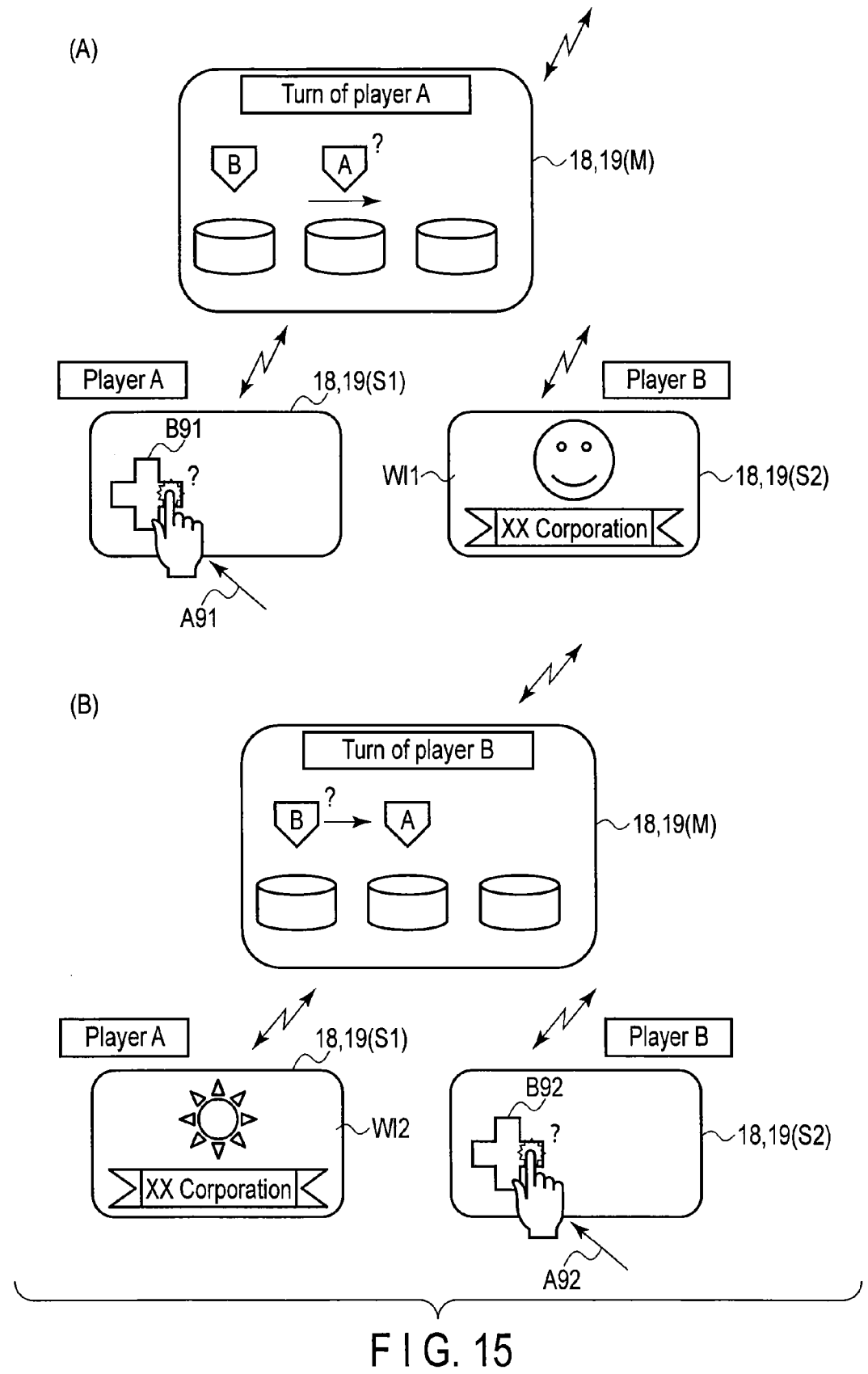
F I G. 15

TERMINAL DISPLAY CONTROL METHOD, TERMINAL DISPLAY SYSTEM AND SERVER APPARATUS

CROSS-REFERENCE TO RELATED APPLICATIONS

This application is based upon and claims the benefit of priority from Japanese Patent Application No. 2013-017770, filed on Jan. 31, 2013, the entire contents of which are incorporated herein by reference.

BACKGROUND OF THE INVENTION

1. Field of the Invention

The present invention relates to a terminal display control method with use of a smartphone, a tablet terminal, etc., a terminal display system, and a server apparatus.

2. Description of the Related Art

There has been developed a technique aiming at giving greater enjoyment to a plurality of players by enhancing the importance of audio inputs of players, giving a sense of community among plural players, and giving a feeling of achievement by progressing a game with the cooperation of plural players, or, to be more specific, a technique in which plural characters on a game perform specific actions, which are different from normal actions, only when plural players utter speeches at substantially the same time (for example, Patent document 1).

CITATION LIST

Patent Literature

Patent document 1: Jpn. Pat. Appln. KOKAI Publication No. 2003-135845

BRIEF SUMMARY OF THE INVENTION

Patent document 1 relates to a technique of a game program which progresses by causing a plurality of characters, which are displayed on a display screen, to perform desired actions by operations of different players. An example, in which a home game machine and a controller for exclusive use in the game machine are used, is disclosed in the description of "Embodiment of the Invention" (paragraph [0017] onwards), and in the drawings (FIG. 1, etc.).

In the meantime, in recent years, mobile terminals called "smartphones" have been gaining in popularity, taking the place of conventional mobile phones called "feature phones". The smartphone includes a touch panel which is formed integral with a relatively large display screen with a diagonal of about 4 inches or more, and has an upgraded data communication function.

In addition, there have been an increasing number of people who carry tablet-type personal computers (hereinafter referred to as "tablet terminals") each having a large display screen with a diagonal of about 10 inches or more and having a communication function, in order to meet the need for a larger display screen than the smartphone.

The object of the present invention is to provide a terminal display control method, a terminal display system and a server apparatus, which can realize an environment in which a smartphone or a tablet terminal, which is possessed by a general user, can be effectively used, and a game can be easily enjoyed, with a personal habit in operation of each user being taken into account.

In general, according to one embodiment, a terminal display control method for using as a controller of a game a terminal device including a touch panel, which is configured to be integral with a display, includes accepting a controller image which is used in the game; setting at least one of a presence/absence of a function, a number, a size, a shape and a position of disposition, with respect to an operation element in the controller image; and making variable, in accordance with a content of the setting, a state of the controller image displayed on the display, and an operation standard of the operation element corresponding to an input on the touch panel.

According to the present invention, it is possible to realize an environment in which a smartphone or a tablet terminal, which is possessed by a general user, can be effectively used, and a game can be easily enjoyed, with a personal habit in operation of each user being taken into account.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 2 is a block diagram illustrating a functional hardware configuration of electronic circuits which are common to a tablet terminal and a smartphone in the embodiment.

FIG. 3 is a sequence chart illustrating process contents as a whole, from the start to the execution of a game between a master device and a slave device according to the embodiment.

FIG. 8 is a view for describing a simultaneous operation on two neighboring buttons in the embodiment.

FIG. 10 is a view for describing a third method for variably setting a detection area of a simultaneous operation on two buttons in the embodiment.

FIG. 14 is a sequence chart illustrating process contents as a whole during a game between a game server apparatus, a master device and a slave device in the embodiment.

FIG. 15 is a view illustrating a case in which two smartphones alternately select a controller image in association with a tablet terminal in the embodiment, and execute a game.

DETAILED DESCRIPTION OF THE INVENTION

First Embodiment

A game system according to a first embodiment of the present invention will now be described with reference to the accompanying drawings.

Figure 1:
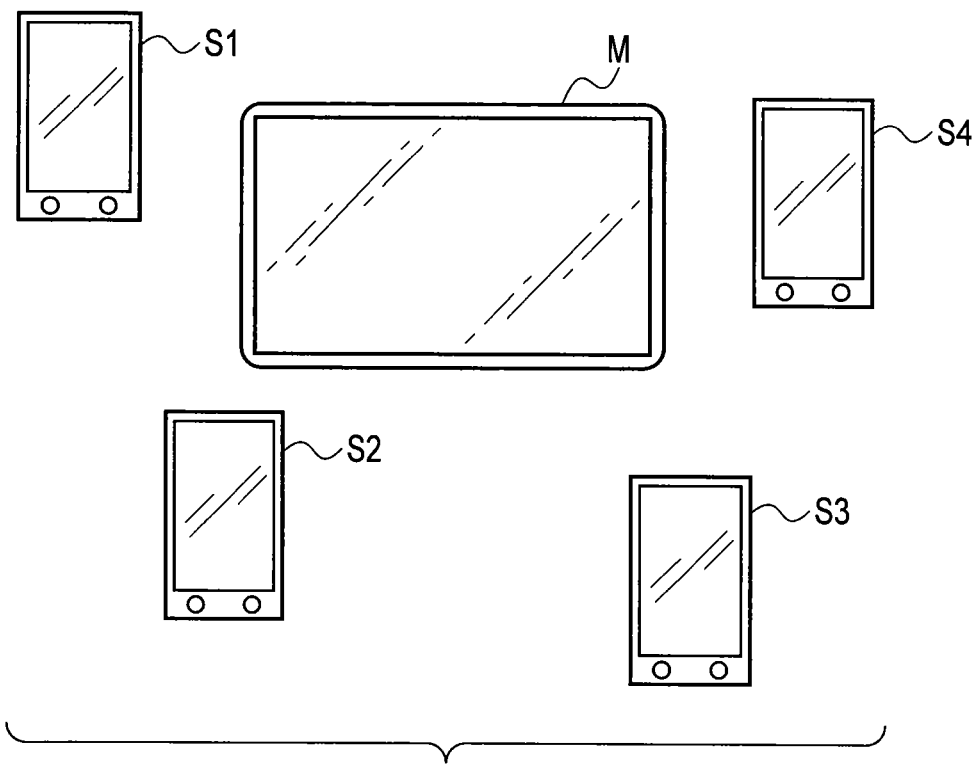
FIG. 1 is a view illustrating an example of an environment of realization of a game system according to a first embodiment of the present invention.

FIG. 1 is a view for describing an example of a system environment according to the embodiment. In FIG. 1, a tablet terminal M, which functions as a shared device, and a plurality of smartphones, for example, four smartphones S1 to S4, which are operated by users, are mutually wirelessly connected by a Bluetooth™ technology which is a near-field wireless communication standard.

A game is executed by a system configuration including the tablet terminal M and smartphones S1 to S4. In this example, the tablet terminal M functions as a master device which becomes a "parent" in the course of game progress. The tablet terminal M executes the progress of the game and the display of the game image in association with operations in the respective smartphones S1 to S4.

The tablet terminal M should desirably have a larger display screen than the smartphones S1 to S4, but the tablet terminal M may be a mobile terminal having the same configuration as the smartphones S1 to S4.

On the other hand, each of the smartphones S1 to S4 is a slave device which becomes a "child", and functions as a game controller which is operated by each user. Each smartphone, S1 to S4, displays an image of the game controller on its display, and transmits, upon accepting a user operation by an operation on the touch panel, a corresponding operation signal to the tablet terminal M.

FIG. 2 is a block diagram illustrating a functional hardware configuration of electronic circuits which are common to the tablet terminal M and smartphones S1 to S4. In FIG. 2, a CPU 11 executes a control operation of the entirety of the tablet terminal M (or smartphone, S1 to S4). A main memory 12, a solid-state drive (SSD) 13, a 3G & 4G communication unit 14, a wireless LAN communication unit 15, a near-field wireless communication unit 16, an external memory card 17, a display 18, a touch panel input unit 19, a key input unit 20, an audio processor 21, an image processor 22, a 3-axis acceleration sensor 23, and a vibrator 24 are connected to the CPU 11 via a system bus SB.

The CPU 11 reads out operation programs (an OS and an application program running on the OS) stored in the solid-state drive 13 and routine data, develops and loads them in the main memory 12, and executes the programs, thereby comprehensively controlling the entire operation of the tablet terminal M (or smartphone, S1 to S4).

The main memory 12 is composed of, for example, an SRAM, and functions as a work memory of the CPU 11. The solid-state drive 13 is composed of a nonvolatile memory, for instance, a flash memory, and stores, as a storage medium of the tablet terminal M (or smartphone, S1 to S4), various contents such as image data and song data, as well as the above-described operation programs and various routine data.

The 3G & 4G communication unit 14 is a communication unit which operates in a dual mode, and transmits/receives data to/from a nearby base station (not shown) via an antenna 25, based on a third-generation mobile communication system according to the IMT-2000 standard, and a fourth-generation mobile communication system according to the IMT-Advance standard.

The wireless LAN communication unit 15 transmits/receives data to/from a nearby access point (not shown) or the like via an antenna 26, based on, for example, the IEEE802.11a/b/g/n standard.

The near-field wireless communication unit 16 transmits/receives data to/from some other Bluetooth™ standard device within a range of, e.g. Class 2 (within a radius of about 10 m).

The external memory card 17 is a medium for expanding the storage capacity of the solid-state drive 13. The external memory card 17 is detachably attached by a user of the tablet terminal M (or smartphone, S1 to S4).

The display 18 is composed of a backlight-equipped TFT color liquid crystal panel, and a driving unit thereof. The display 18 displays various images.

The touch panel input unit 19 is configured to be integral with the display 18 by using a transparent electrode. The touch panel input unit 19 generates and outputs two-dimensional position coordinate information which corresponds to a touch operation by the user.

The key input unit 20 is composed of some key switches including a power key and a shutter key of a camera function, which are provided on the outer surface of the casing of the tablet terminal M (or smartphone, S1 to S4), and a driving circuit of these key switches.

The audio processor 21 converts digital audio data, which is delivered via the system bus SB, to an analog audio signal, and outputs the analog audio signal from a speaker 28. In addition, the audio processor 21 samples an analog audio signal, which is input from a microphone 29, converts the analog audio signal to digital data and outputs the digital data.

The image processor 22 converts to digital data an image signal which is output from a solid-state imaging device 31 in accordance with an optical image which is focused on an imaging surface of the solid-state imaging device 31 via an optical lens system 30. The solid-state imaging device 31 is composed of, for example, a CCD (Charge Coupled Device) or a CMOS image sensor. The image processor 22 creates and outputs file data which is compressed in data amount by a preset file format, for example, by JPEG (Joint Photographic Experts Group) in the case of a still image.

Next, an operation of the first embodiment is described.

The operation to be described below is executed after the CPU 11 in each of the tablet terminal M and smartphones S1 to S4 has read out the operation programs stored in the solid-state drive 13, as described above, and has developed and loaded the operation programs in the main memory 12. The operation programs stored in the solid-state drive 13 are not limited to programs which were stored in the solid-state drive 13 at a time of factory shipment of the tablet terminal M (or smartphone, S1 to S4), and may be programs which are input from the outside by the user of the tablet terminal M (or smartphone, S1 to S4) via the antenna 25 and 3G & 4G communication unit 14, or the antenna 26 and wireless LAN communication unit 15.

FIG. 3 is a sequence chart illustrating process contents as a whole, from the start to the execution of a game between the tablet terminal M that is a master device and the smartphone, S1 to S4, that is a slave device.

To begin with, a pairing process based on the Bluetooth™ standard is executed between the tablet terminal M and the smartphone, S1 to S4, thereby establishing a wireless connection state between the tablet terminal M functioning as the master device and the smartphone, S1 to S4, functioning as the slave device (step M101, S101). It is assumed that this pairing process, if once executed between the tablet terminal M and the smartphone, S1 to S4, can be omitted when the game is to be executed at the second and following times.

Thereafter, the tablet terminal M starts an application program for the master device of the associated game (step M102). On the other hand, each of the smartphones S1 to S4 starts an application program for the slave device of the associated game (step M102).

A controller image, which is used in the game, is designated from the tablet terminal M to the smartphone, S1 to S4 (step M103). As regards the designation of the controller image, it is possible to designate choices of plural patterns of the controller image if these patterns include operation elements such as buttons and analog sticks necessary for the game, so that the user can select an arbitrary controller image on the side of the smartphone, S1 to S4.

Each of the smartphones S1 to S4 chooses an arbitrary one among plural controller images, where necessary, and executes setup of the controller in accordance with an operation on the touch panel input unit 19 (step S103).

Figure 4:
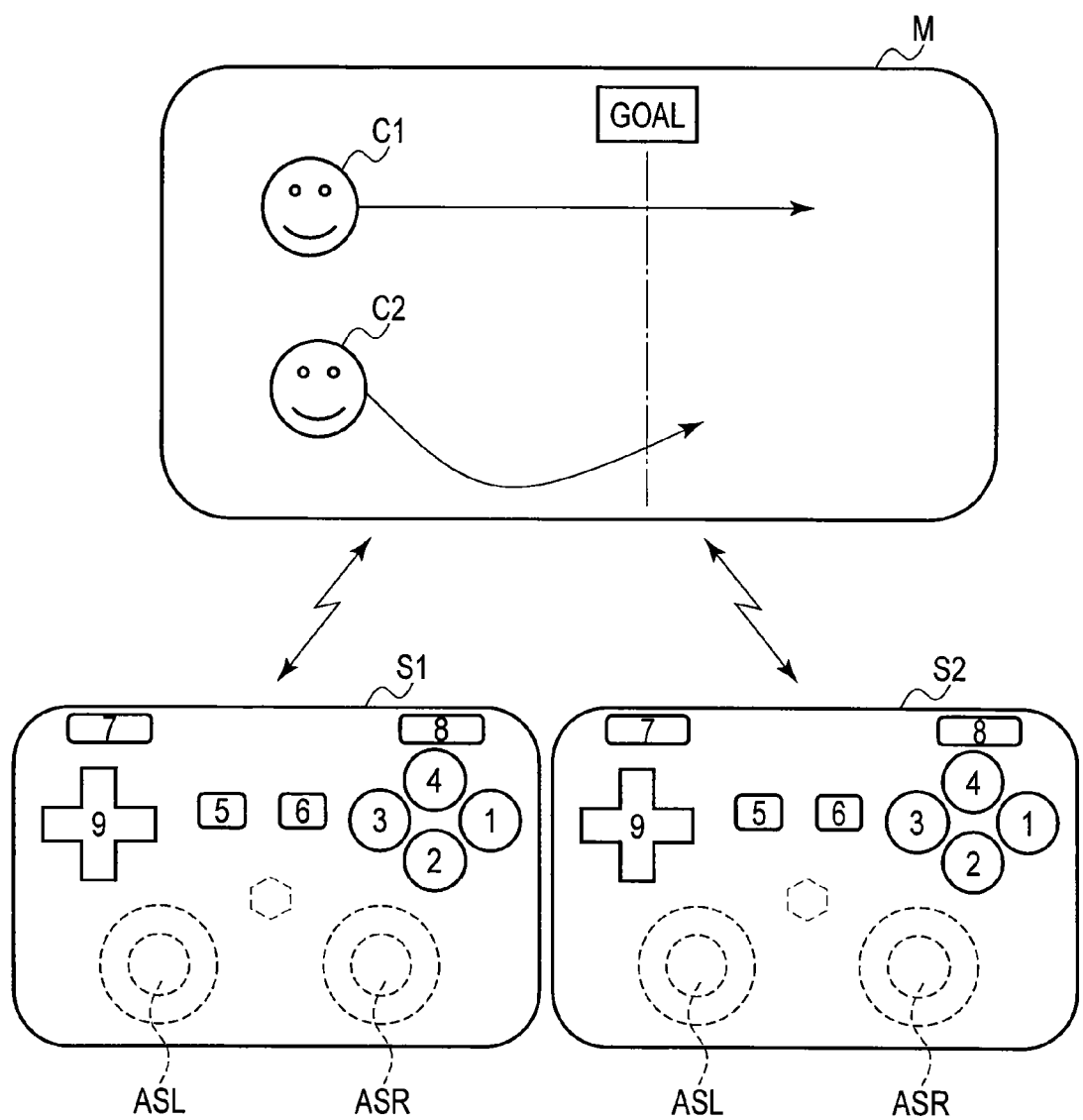
FIG. 4 is a view illustrating a case in which two smartphones select controller images of the same pattern in association with the tablet terminal according to the embodiment, and execute a game.

FIG. 4 illustrates an example of the case in which smartphones S1 and S2 select controller images of the same pattern in association with the tablet terminal M, and execute a game. In this game, the display 18 of the tablet terminal M displays a character C1 which operates by an operation on the smartphone S1, and a character C2 which operates by an operation on the smartphone S2, and these characters C1 and C2 are moved so that either of them may finish the goal line earlier.

In this case, in the controller image displayed on the smartphone S1, S2, it is assumed that the start and end of the game, the operation of the speed of movement, the obstruction to the other character, etc. can be executed by operations of buttons indicated by "1" to "8", and the basic direction of movement of the character is operated by an operation of, for example, a cross (+) key "9".

In addition, two operation elements ASL and ASR, which simulate analog sticks on the lower side of the screen, are not used in this game and are indicated by broken lines.

After the setup of the controller image in step S103, the CPU 11 of the smartphone, S1 to S4, determines customization setup by an arbitrary selection by the user. Specifically, the CPU 11 determines whether or not to make variable, and set, at least one of a presence/absence of a function, a number, a size, a shape and a position of disposition, with respect to an operation element in the controller image, based on an operation on the touch panel input unit 19 (step S104).

If the user has executed an associated operation in order to customize the controller image, the CPU 11 executes, upon receiving this operation, a necessary customization process (step S105). Concrete various customization processes will be described later in detail.

After executing the customization process in accordance with the user's option, the smartphone, S1 to S4, notifies the tablet terminal M that the game is ready to start, in accordance with a user operation (step S106).

The tablet terminal M stands by for the notification that the game is ready to start, from all the smartphones S1 to S4 which have established the connection state by the pairing process in step M101 (step M104). After confirming all the notifications, the tablet terminal M notifies the start of the game to the smartphones S1 to S4 (step M105).

After designating the start of the game, the tablet terminal M executes a game progress process and updates the display on the display device 18 (step M106), and transmits to the smartphones S1 to S4, where necessary, the information about images which are to be displayed on the game on the smartphones S1 to S4 that display the controller images, for example, the information about images of operation buttons which are temporarily enabled or scores (step M107).

Further, the tablet terminal M determines whether an operation signal from any one of the smartphones S1 to S4 has been received (step M108). If it is determined that the operation signal has been received, the tablet terminal M executes a reception process of the received operation signal (step M109), and returns to the process from M106 so as to transition to the next game development by utilizing the received operation signal where necessary.

In this manner, the tablet terminal M repeatedly executes the process of the above steps M106 to M109, thereby continuing to control the progress of the game while accepting operation signals from the smartphones S1 to S4.

On the other hand, after notifying the tablet terminal M in step S106 that the game is ready to start, the smartphones S1 to S4 start the game upon receiving the notification of the start of the game from the tablet terminal M which has responded to the notification by the smartphones S1 to S4 (step S107).

Each of the smartphones S1 to S4 determines whether an image for an operation, for instance, which is sent from the tablet terminal M, has been received (step S108). If the image for an operation has been received, the smartphone, S1 to S4, executes a process of, for example, reflecting the display of the controller image on the display 18, based on the received information (step S109).

Furthermore, each of the smartphones S1 to S4 determines whether an operation has been executed in accordance with an operation signal from the touch panel input unit 19 (step S110). If it is determined that the operation has been executed, the smartphone, S1 to S4, generates an operation signal corresponding to this operation, and transmits the operation signal to the tablet terminal M (step S111).

In addition, the smartphone, S1 to S4, returns to the process from step S108, after executing correction setup on operation elements such as the operated buttons, based on the contents of the operations determined in step S110 and the operation history thus far.

In this manner, by repeatedly executing the process of steps S108 to S112 hereafter, the smartphone, S1 to S4, continues the game by accepting the user's input operation on the controller image, and also continues the correction process on the operation elements such as the buttons, analog sticks, etc. displayed on the display 18.

In the meantime, it is assumed that the customization process on an arbitrary game controller by the user in step S105 may be executed not only before the start of the game, but also during the game after the start of the game.

Next, a description will be given of some concrete examples of the above-described customization process of the game controller and the correction process.

Figure 5:
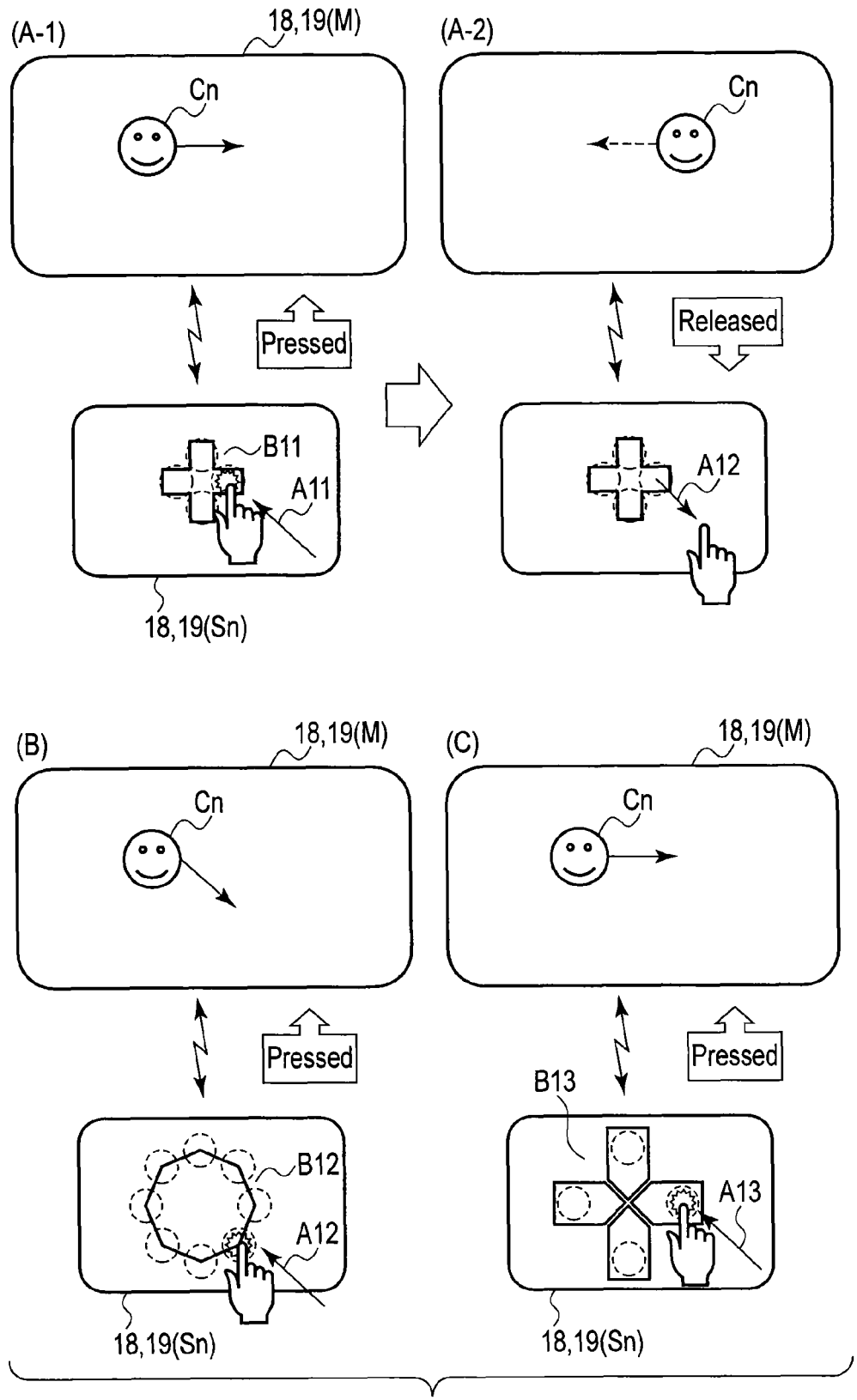
FIG. 5 is a view for describing examples of selection of buttons for moving a character in the embodiment, and respective operations.

FIG. 5 is a view for describing a controller image including a button which may be selected by a customization process by the user of the smartphone, S1 to S4, and an operation of moving a character in accordance with a button operation.

Parts (A-1) and (A-2) of FIG. 5 illustrate an example in which a controller image including a button B11, which is generally called "cross key" and instructs a movement in one of four directions by one button, has been selected in a customization process in a smartphone Sn (n: any one of 1 to 4). Parts (A-1) and (A-2) of FIG. 5 show, by way of example, states of movement of a character Cn (n: any one of 1 to 4) which is displayed on the tablet terminal M in accordance with an operation of the button B11, when this operation has been executed. Part (A-1) of FIG. 5 illustrates a state in which the user executes a pressing operation on a "right" side of the button B11, as indicated by an arrow A11, and thereby the associated character Cn moves to the "right" side on the display 18 of the tablet terminal M.

Thereafter, as shown in part (A-2) of FIG. 5, the user releases the pressing operation on the "right" side of the button B11, as indicated by an arrow A12. Thereby, on the display 18 of the tablet terminal M, the corresponding character Cn stops the movement to the "right" side.

Part (B) of FIG. 5 illustrates a case in which a controller image including a button B12, which instructs a movement in any one of eight directions by one button, has been selected in the smartphone Sn (n: any one of 1 to 4), and the button B12 has been operated, and part (B) of FIG. 5 shows, by way of example, a state of movement of the character Cn (n: any one of 1 to 4) which is displayed on the tablet terminal M in accordance with the operation of the button B12.

Part (B) of FIG. 5 illustrates a state in which the user executes a pressing operation on a "lower right" side of the button B12, as indicated by an arrow A12, and thereby the associated character Cn moves to the "lower right" side on the display 18 of the tablet terminal M.

Part (C) of FIG. 5 illustrates a case in which a controller image including a button B13, which instructs a movement in any one of four directions by four independent buttons, has been selected in the smartphone Sn (n: any one of 1 to 4), and this button B13 has been operated, and part (C) of FIG. 5 shows, by way of example, a state of movement of the character Cn (n: any one of 1 to 4) which is displayed on the tablet terminal M in accordance with this operation of the button B13.

Part (C) of FIG. 5 illustrates a state in which the user executes a pressing operation on a "right" side of the button B13, as indicated by an arrow A13, and thereby the associated character Cn moves to the "right" side on the display 18 of the tablet terminal M.

Figure 6:
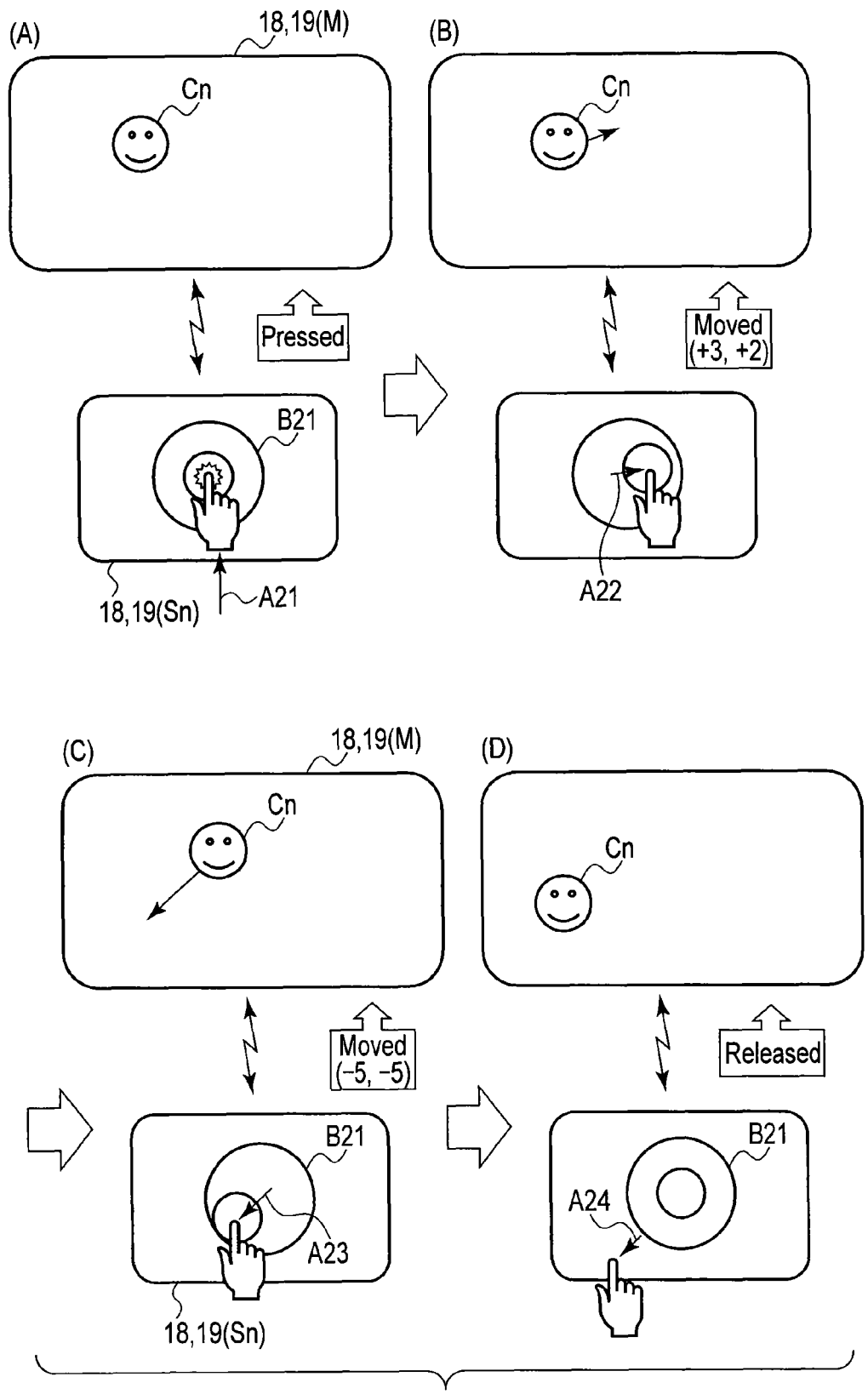
FIG. 6 is a view for describing an operation of a button simulating an analog stick for moving a character in the embodiment.

FIG. 6 is a view for describing a controller image including a button simulating an analog stick which may be selected by a customization process by the user of the smartphone, S1 to S4, and an operation of moving a character in accordance with a button operation.

In this example, a button simulating an analog stick is expressed as a button image B21 having a shape of two concentric circles (in a state in which no operation is executed). An inner circle of the button image B21 is indicative of an operation element, and an outer circle is indicative of an operation range. The button image B21 is displayed such that the position of the inner circle moves in accordance with a touch position by slide-operating and moving the inner circle in an arbitrary direction while touch-operating the inner circle within the range of the outer circle. By detecting the movement direction and movement amount of the touch operation on the button image B21, it becomes possible to display the character Cn in a manner to arbitrarily move in any direction over the range of 360° in a stepless manner, in accordance with the movement speed of the touch operation.

Specifically, as shown in part (A) of FIG. 6, the user performs a touch operation within the inner circle of the button B21 by the smartphone Sn (n: any one of 1 to 4), as indicated by an arrow A21, and performs, while keeping the touch state, a slide operation to an "upper right" side, as indicated by an arrow A22 in part (B) of FIG. 6. Thereby, a coordinate value "+3, +2" indicative of the operation direction is detected by the touch panel input unit 19. In the tablet terminal M, the display 18 displays the character Cn in a manner to move in the "upper right" direction in accordance with the coordinate value.

Further, from the state in which the touch operation of the inner circle of the button B21 is performed as shown in part (B) of FIG. 6, a slide operation of the inner circle is performed to a "lower left" side, as indicated by an arrow A23 in part (C) of FIG. 6. Thereby, a coordinate value "−5, −5" indicative of the operation direction is detected by the touch panel input unit 19. In the tablet terminal M, the display 18 displays the character Cn in a manner to move in the "lower left" direction in accordance with this coordinate value.

Thereafter, as shown in part (D) of FIG. 6, if the touch operation of the inner circle of the button B21 by the user is released as indicated by an arrow A24, the tablet terminal M stops the movement of the character Cn to the "lower left" side on the display 18.

Figure 7:
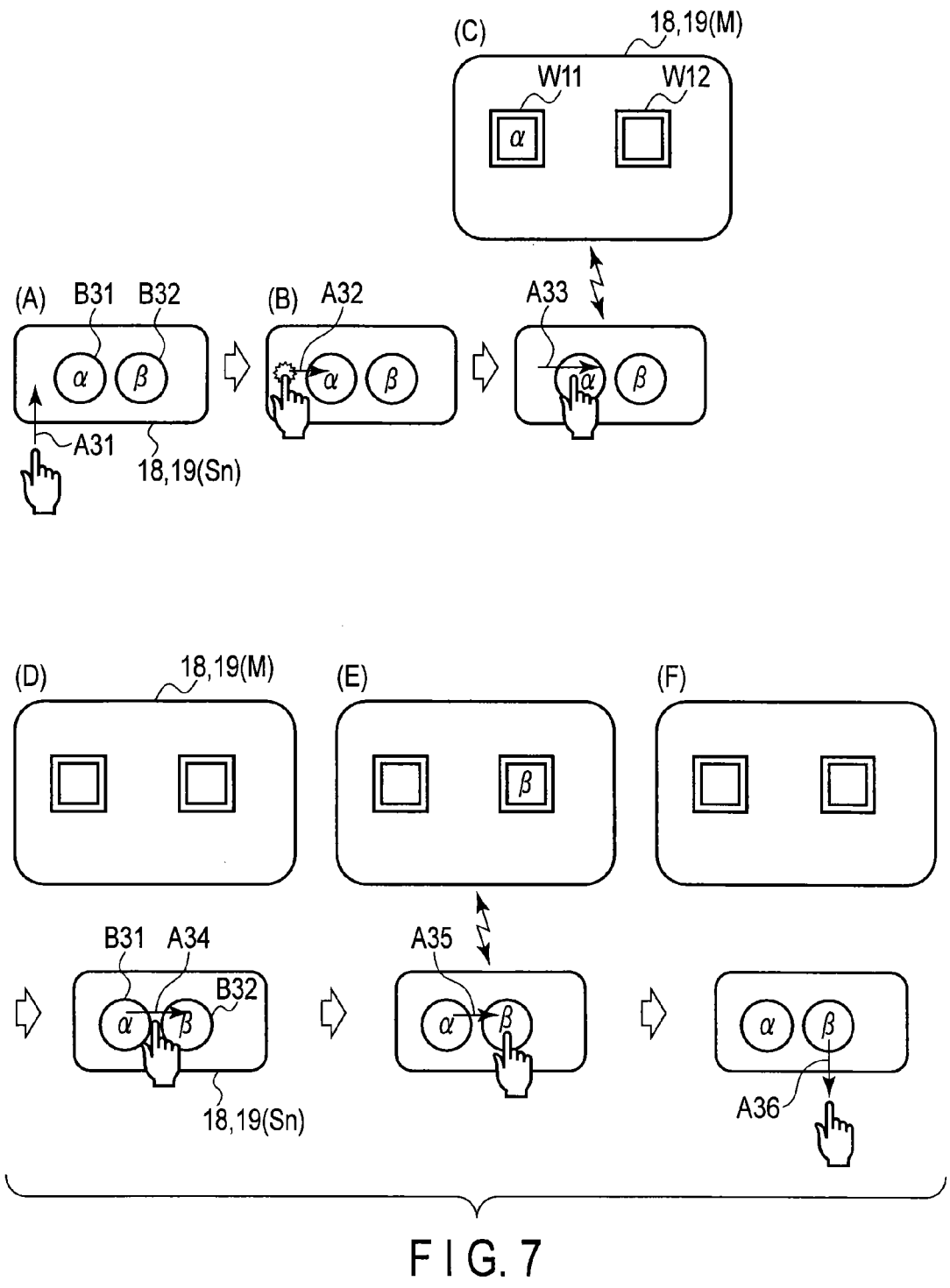
FIG. 7 is a view for describing a successive operation on two neighboring buttons in the embodiment.

FIG. 7 is a view for describing a successive operation on two neighboring buttons in the controller image, which may be selected by the user of the smartphone, S1 to S4, in the customization process.

In this case, at the time of customization setup, the display 18 is caused to display, for example, a guide message "when successive keys are set up, execute an operation across the 'α' button and 'β' button at a time", and an image of an operation example. The smartphone, S1 to S4, accepts the operation across the "α" button and "β" button, and thereby the successive keys can be set up.

In this example, two windows W11 and W12 are displayed in a game image on the display 18 of the tablet terminal M, and two neighboring buttons B31 and B32 are displayed on the smartphone Sn (n: any one of 1 to 4). A description is given of the case in which an item "α" is temporarily displayed in the window W11 when the button B31 has been touch-operated, and an item "β" is temporarily displayed in the window W12 when the button B32 has been touch-operated.

Specifically, as shown in part (A) of FIG. 7, the user touch-operates, as indicated by an arrow A31, an outside area on the left side of the button B31 which is the left-side one of the two neighboring buttons B31 and B32 of the smartphone Sn. While keeping the touch state, the user performs a slide operation to the "right" side, as indicated by an arrow A32 in part (B) of FIG. 7.

In part (C) of FIG. 7, at a time when the touch position has entered the area of the button B31, as indicated by an arrow A33, the touch panel input unit 19 detects this state, and a corresponding operation signal is transmitted from the smartphone Sn to the tablet terminal M. Thereby, on the tablet terminal M, the item "a" is caused to appear in the window W11.

Thereafter, as shown in part (D) of FIG. 7, if the touch position has moved out of the button B31 by a further slide operation as indicated by an arrow A34, the touch panel input unit 19 detects that the touch operation on the button B21 has been released, and the transmission of the operation signal from the smartphone Sn to the tablet terminal M is stopped. In the tablet terminal M, the display of the item "α" in the window W11 is turned off.

In part (E) of FIG. 7, at a time when the touch position has entered the area of the button B32 by a further slide operation, as indicated by an arrow A35, the touch panel input unit 19 detects this state, and a corresponding operation signal is transmitted from the smartphone Sn to the tablet terminal M. Thereby, on the tablet terminal M, the item "β" is caused to appear in the window W12.

In part (F) of FIG. 7, if the user has released the finger from the touch panel input unit 19, as indicated by an arrow A36, the touch panel input unit 19 detects that there is no longer the touch operation on the button B32, and the transmission of the operation signal from the smartphone Sn to the tablet terminal M is stopped. In the tablet terminal M, the display of the item "β" in the window W12 is turned off.

FIG. 8 is a view for describing a simultaneous operation on two neighboring buttons in the controller image, which may be selected by the user of the smartphone, S1 to S4, in the customization process.

In this case, at the time of customization setup, the display 18 is caused to display, for example, a guide message, "When simultaneous keys are set up, execute an operation across two buttons that are to be set", and an image of an operation example. The smartphone, S1 to S4, accepts the operation across the "α" button and "β" button, and thereby the simultaneous keys can be set up.

In this example, two windows W21 and W22 are displayed in a game image on the display 18 of the tablet terminal M, and two neighboring buttons B41 and B42 are displayed on the smartphone Sn (n: any one of 1 to 4). A description is given of the case in which, when an overlap area including an area between the buttons B41 and B42 has been touch-operated, an item "α" is displayed in the window W21 corresponding to the button B41, and at the same time an item "β" is displayed in the window W22 corresponding to the button B42.

Specifically, in part (A) of FIG. 8, the user touch-operates, as indicated by an arrow A41, an outside area on the left side of the button B41 which is the left-side one of the two neighboring buttons B41 and B42 of the smartphone Sn. While keeping the touch state, the user performs a slide operation to the right side, as indicated by an arrow A42 in part (B) of FIG. 8.

In part (C) of FIG. 8, at a time when the touch position has entered the area of the button B41, as indicated by an arrow A43, the touch panel input unit 19 detects this state, and a corresponding operation signal is transmitted from the smartphone Sn to the tablet terminal M. Thereby, on the tablet terminal M, the item "a" is caused to appear in the window W21.

Thereafter, as shown in part (D) of FIG. 8, if the touch position has entered an area AR11, which includes an area between the button B41 and button B42 and spans between the button B41 and button B42, by a further slide operation as indicated by an arrow A44, the touch panel input unit 19 detects that the area corresponding to the two buttons has been operated, and an operation signal is transmitted from the smartphone Sn to the tablet terminal M. Upon receiving this operation signal, the tablet terminal M simultaneously displays the item "β" in the window W22, in addition to the display of the item "α" in the window W21.

In part (E) of FIG. 8, at a time when the touch position has moved out of the area AR11 spanning between both buttons by a further slide operation and has entered the area of only the next button B42, as indicated by an arrow A45, the touch panel input unit 19 detects this state, and a corresponding operation signal is transmitted from the smartphone Sn to the tablet terminal M. Thereby, on the tablet terminal M, the display of the item "α" in the window W21 is turned off, and only the item "β" is displayed in the window W22.

In part (F) of FIG. 8, if the user has released the finger from the touch panel input unit 19, as indicated by an arrow A46, the touch panel input unit 19 detects that there is no longer the touch operation on the button B42, and the transmission of the operation signal from the smartphone Sn to the tablet terminal M is stopped. In the tablet terminal M, the display of the item "β" in the window W22 is turned off.

Figure 9:
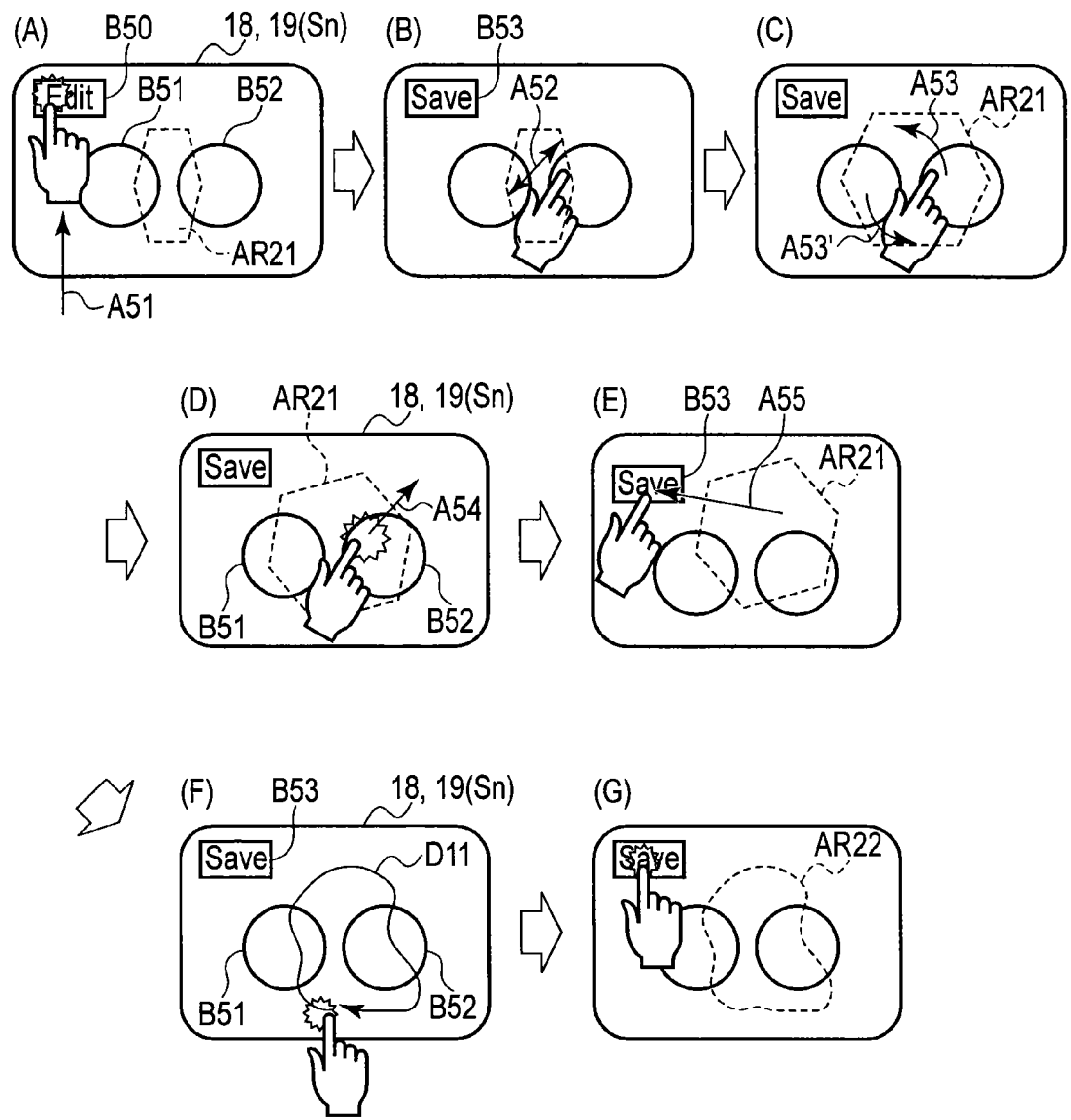
FIG. 9 is a view for describing a first method and a second method for variably setting a detection area of a simultaneous operation on two neighboring buttons in the embodiment.

FIG. 9 is a view for describing a first method and a second method for variably setting a detection area of a simultaneous operation on two neighboring buttons in a controller image, these methods being executed by the user of the smartphone, S1 to S4, in the customization process.

It is now assumed that two buttons B51 and B52 are displayed adjacent to each other with a proper gap on the display 18 of the smartphone Sn (n: any one of 1 to 4), that an overlap area AR21, which includes this gap and spans between both buttons, is displayed by a broken line, and that an "Edit" button B50 is displayed on an upper left end side of the screen.

In part (A) of FIG. 9, if the user touch-operates the "Edit" button B50, as indicated by an arrow A51, the smartphone Sn switches the "Edit" button B50 to a "Save" button B53, and transitions into an edit mode.

In part (B) of FIG. 9, if a pinch-out operation of the overlap area AR21 is performed in the edit mode by the user by two fingers, as indicated by an arrow A52, the smartphone Sn enlarges the overlap area AR21.

Further, in part (C) of FIG. 9, if the two fingers are rotated counterclockwise, as indicated by arrows A53 and A53', from the state of the pinch-out operation, the smartphone Sn can incline and set the enlarged overlap area AR21 in accordance with the rotational angle.

Thereafter, in part (D) of FIG. 9, if the user releases the fingers from the touch panel input unit 19, as indicated by an arrow A54, at a time point when the user has determined that the size, shape and inclination of the overlap area AR21 are set in a desired state, the smartphone Sn can set the overlap area AR21 in a provisional state.

In part (E) of FIG. 9, if the "Save" button B53 is touch-operated in this state, as indicated by an arrow A55, the smartphone Sn sets the overlap area AR21 at this time point as a finally determined overlap area.

As regards the overlap area AR21 for determining a simultaneous operation of the buttons B51 and B52, by executing this customization setup, the personal habit in operation of the user can be taken into account. For example, the shape of the overlap area AR21 can easily be made adaptive to such a case that a drawing operation is performed in a flipping manner from the lower left to the upper right. Thus, the operability for the user is enhanced.

In addition, a description is given of a setup method of another overlap area AR22, which is different from the method of parts (B) to (E) of FIG. 9.

From the state described in part (A) of FIG. 9, if the user touch-operates the "Edit" button B50, as indicated by an arrow A51, the smartphone Sn switches the "Edit" button B50 to a "Save" button B53, and transitions into an edit mode.

In this case, as shown in part (F) of FIG. 9, a touch operation by a finger of the user is performed so as to surround a gap between the buttons B51 and B52 on the touch panel input unit 19. In the smartphone Sn, in accordance with the touch operation, a closed figure, as indicated by an arrow D11, is drawn on the touch panel input unit 19.

In accordance with this operation, as shown in part (G) of FIG. 9, the smartphone Sn sets the overlap area AR22 in a provisional state. If the "Save" button B53 is touch-operated by the user, the overlap area AR22 at this time point is finally determined, and the overlap area AR22 is set.

By executing setup by the customization based on the drawing operation, the overlap area AR22 for determining the simultaneous operation of the buttons B51 and B52 can be set more easily.

FIG. 10 is a view for describing a third method for variably setting a detection area of a simultaneous operation on two neighboring buttons in a controller image, the method being executed by the user of the smartphone, S1 to S4, in the customization process.

In this method, two buttons B61 and B62 are displayed adjacent to each other with a proper gap on the display 18 of the smartphone Sn (n: any one of 1 to 4), that a "Start" button B60 is displayed on an upper left end side of the screen, and that a guide message GM11, "Try X times", is displayed on a lower end side of the screen. The guide message GM11 gives an instruction to try point-position designation of a detection area, and designates the number of times of try.

In part (A) of FIG. 10, if the user touch-operates the "Start" button B60, as indicated by an arrow A61, the smartphone Sn switches the "Start" button B60 to a "Cancel" button B63, and starts a trial of point-position designation.

As shown in part (B) of FIG. 10, if point positions are successively touch-operated by the user by the number of times designated, so as to designate the above-described overlap area, the smartphone Sn successively displays the touch-operated positions on the display 18.

Then, as shown in part (C) of FIG. 10, at a time point when the touch operation by the designated number of times has been completed, the smartphone Sn sets an overlap area AR31, which includes the touch positions of the designated number of times, in a provisional state, and displays the overlap area AR31 on the display 18.

At this time, the smartphone Sn displays, on an upper end part of the screen of the display 18, a "Yes" button B64 for finally determining the overlap area AR31 and a "Retry" button B65 for retrying the setup, in addition to the "Cancel" button B63, and also displays, on a lower end part of the screen, a guide message GM12, "Is this OK?", which prompts the user to select any one of the buttons.

If the "Retry" button B65 is touch-operated in this display state, as indicated by an arrow A63, the smartphone Sn restores to the state, shown in part (B) of FIG. 10, for accepting the designation of point positions.

On the other hand, if the "Yes" button B64 is touch-operated, as indicated by an arrow A62, the smartphone Sn sets the overlap area AR31, as shown in part (D) of FIG. 10, by deeming that the overlap area AR31 at that time point has been finally determined.

By the point-position designation of the predetermined number of times, the overlap area AR31 for determining the simultaneous operation of the buttons B61 and B62, which is optimal for each user, can easily be set.

Figure 11:
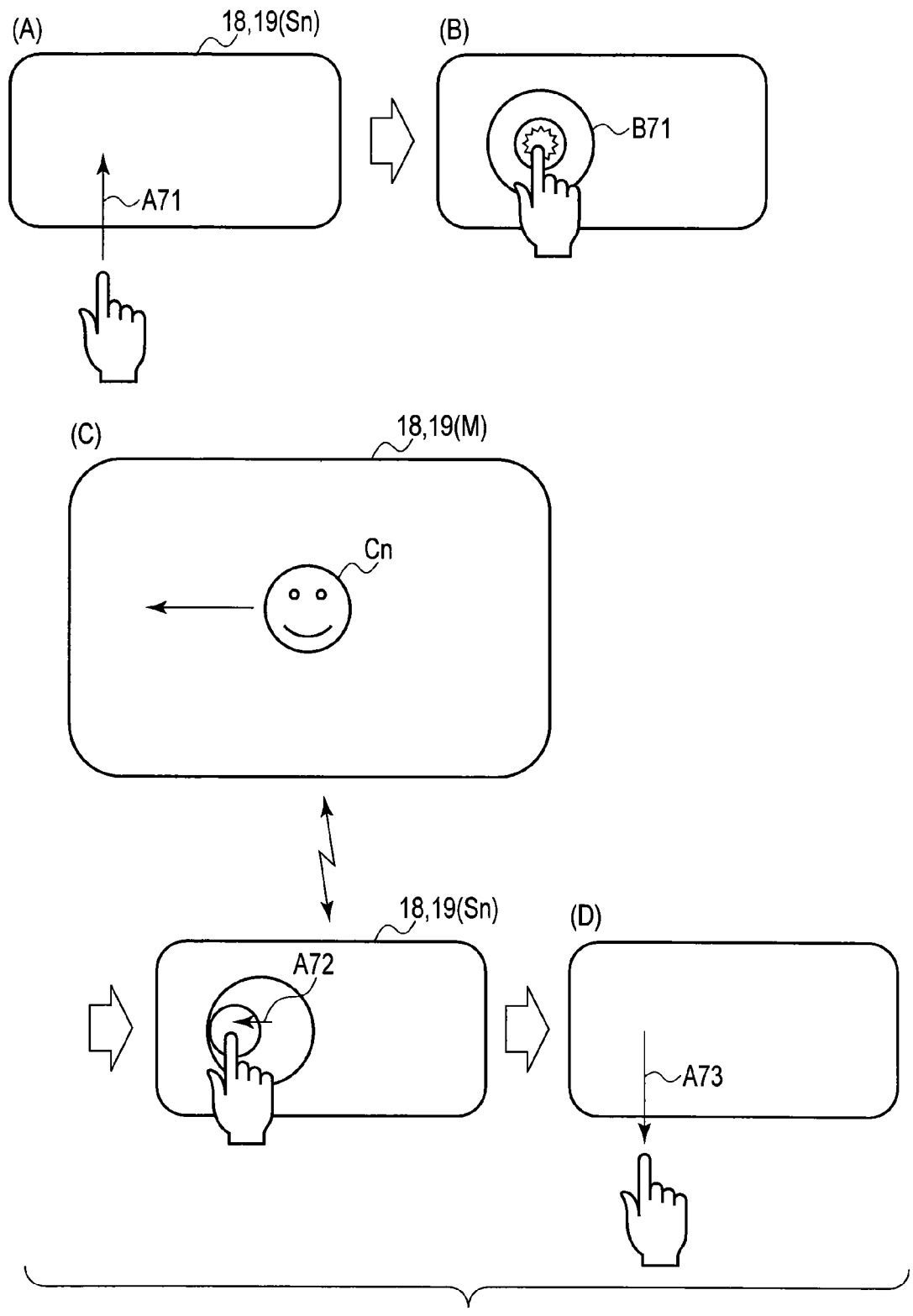
FIG. 11 is a view for describing a method of disposing a button at an arbitrary position in the embodiment.

FIG. 11 is a view for describing a method of disposing a button at an arbitrary position in a controller image, the method being executed by the user of the smartphone, S1 to S4, in the customization process.

As shown in part (A) of FIG. 11, in the smartphone Sn (n: any one of 1 to 4), it is assumed that an arbitrary position has been touch-operated by the user's finger, as indicated by an arrow A71, on the display 18 which displays no image.

As illustrated in part (B) of FIG. 11, the smartphone Sn detects the touch-operated position from the touch panel input unit 19, and disposes and displays a button B71 at a corresponding position on the display 18. The case is now illustrated that a button simulating an analog stick is disposed as the button that is to be disposed.

The button B71 simulating the analog stick is expressed as a button image B71 having a shape of two concentric circles (in a state in which no operation is executed). In this case, an inner circle of the button image B71 is indicative of an operation element, and an outer circle is indicative of an operation range. The button image B71 is displayed such that the inner circle is slide-operated and moved in an arbitrary direction within the range of the outer circle, while the inner circle is being touch-operated, and thereby the position of the inner circle moves in accordance with the touch position. By detecting the movement direction and movement amount of the touch operation on the button image B71, it becomes possible to arbitrarily move the character Cn in any direction over the range of 360° in a stepless manner, in accordance with the movement speed of the touch operation.

Specifically, as shown in part (C) of FIG. 11, the user performs a touch operation within the inner circle of the button B71 by the smartphone Sn, as indicated by an arrow A72, and performs, while keeping the touch state, a slide operation to a "left" side. Thereby, the inner circle is moved and displayed within the range of the outer circle in accordance with the operation position, and the operation signal is transmitted to the tablet terminal M. In the tablet terminal M, the corresponding character Cn is moved on the display 18 in the "left" direction in accordance with the operation direction.

Thereafter, as shown in part (D) of FIG. 11, if the user releases the finger from the display 18, as indicated by an arrow A73, the smartphone Sn turns off the display of the button image B71 from the display 18 in accordance with the detection by the touch panel input unit 19.

In this manner, as well as the button B71 simulating the analog stick, another button or switch may be disposed and set at an arbitrary position in the screen of the display 18. Thereby, a controller with high operability matching with the preference of the user can be realized.

Figure 12:
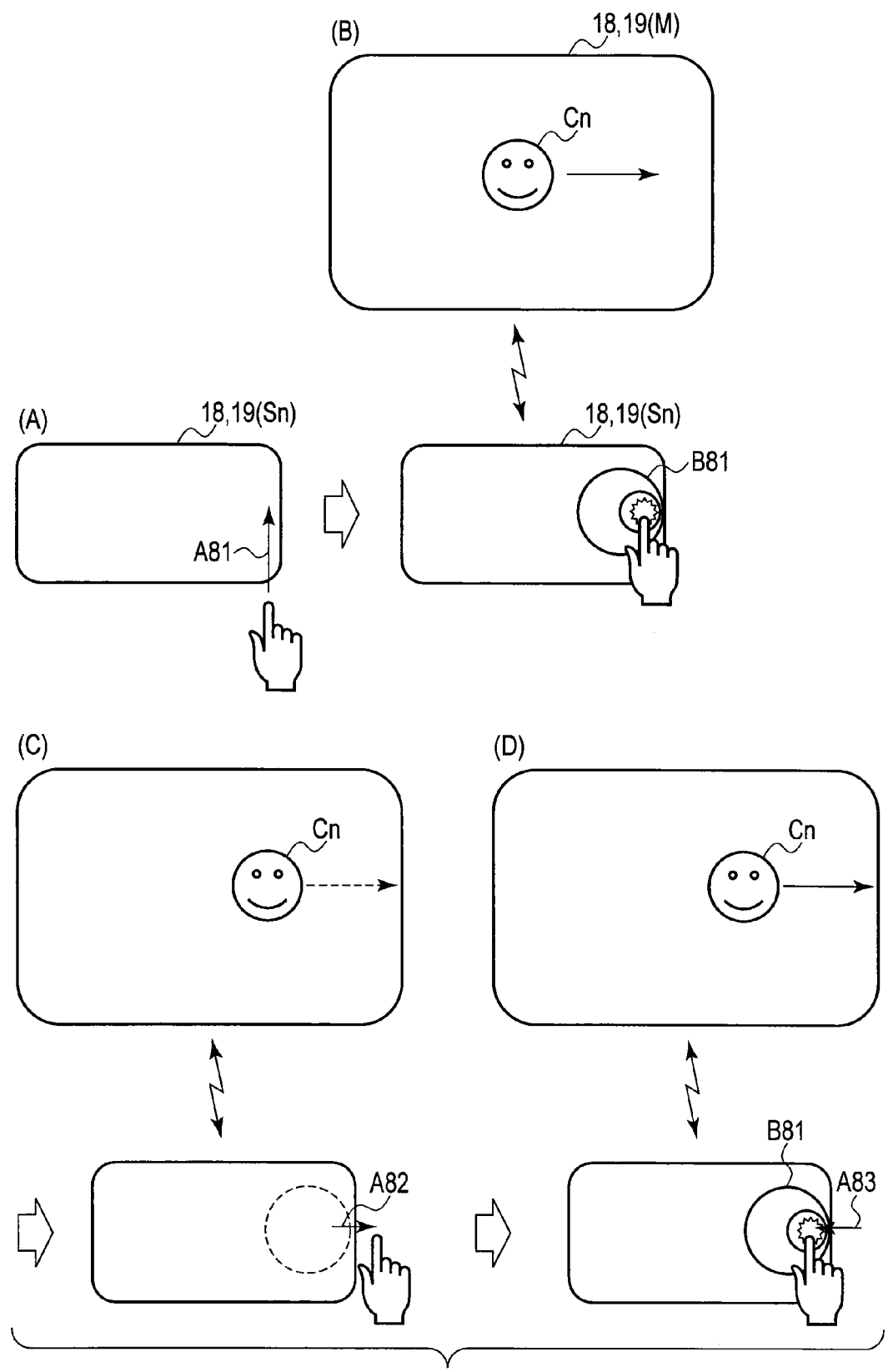
FIG. 12 is a view for describing a method of correcting of a button which has been disposed at an arbitrary position in the embodiment.

FIG. 12 is a view for describing a method of correcting of the position of a button, in a case of operating the button as a controller at a time when the user of the smartphone, S1 to S4, actually executes a game.

In part (A) of FIG. 12, in the smartphone Sn (n: any one of 1 to 4), it is assumed that, when a game is executed, an arbitrary position has been touch-operated by the user's finger on the display 18 which displays no image, as indicated by an arrow A71.

As illustrated in part (B) of FIG. 12, the smartphone Sn detects the touch-operated position from the touch panel input unit 19, and disposes and displays a button B81, which simulates an analog stick, at a corresponding position on the display 18.

The button B81 simulating the analog stick is expressed as a button image having a shape of two concentric circles (in a state in which no operation is executed). In this case, an inner circle of the button image B81 is indicative of an operation element, and an outer circle is indicative of an operation range. The button image B81 is displayed such that the inner circle is slide-operated and moved in an arbitrary direction within the range of the outer circle, while the inner circle is being touch-operated, and thereby the position of the inner circle moves in accordance with the touch position. By detecting the movement direction and movement amount of the touch operation on the button image B81, it becomes possible to arbitrarily move the character Cn in any direction over the range of 360° in a stepless manner, in accordance with the movement speed of the touch operation.

In the case of the button image B81 shown in part (B) of FIG. 12, the position of the user's touch operation is at a right side end portion of the display 18. Thus, the inner circle and outer circle of the button image B81 cannot be displayed in a concentric shape in accordance with the position of the touch operation. In this case, from the start of display, the smartphone Sn displays the button image B81 in the state in which the inner circle is moved to the right side within the outer circle of the button image B81, and transmits the associated operation signal to the tablet terminal M. In the tablet terminal M, the character Cn is moved on the display 18 in the "right" direction in accordance with the operation direction.

Thereafter, as shown in part (C) of FIG. 12, if the user has executed an operation of releasing the finger from the touch panel input unit 19 in a direction indicated by an arrow A82, the smartphone Sn stops the display of the button B81 and stops the transmission of the operation signal to the tablet terminal M, since the touch operation on the touch panel input unit 19 stops. Accordingly, the tablet terminal M stops the movement of the character Cn displayed on the display 18.

Subsequently, in part (D) of FIG. 12, if the user has touch-operated once again the right side end portion of the touch panel input unit 19 by the finger, as indicated by an arrow A83, the smartphone Sn displays once again the button image 81 in the state in which the inner circle is moved to the right side within the outer circle, and transmits the associated operation signal to the tablet terminal M. In the tablet terminal M, the character Cn is moved once again on the display 18 in the "right" direction.

In this manner, even when the user of the smartphone Sn has executed such an operation as to deviate from the display 18 and touch panel input unit 19, while operating the smartphone Sn which displays the controller image, the display range of the button image B81 is limited in advance within the display range of the display 18, so that the button image B81 may never be displayed outside the screen of the display 18. Thus, at a time point when the operation by the user has been restored, the immediately prior operation state is reproduced and the game is continued. Therefore, the operability in the course of the game is not degraded, and an operational error by the user can surely be corrected.

In addition, while the user is progressing the game, there are many cases in which the user operates various operation buttons whose positions were set by the user, without viewing the controller image that is displayed on the display 18 of the smartphone Sn (n: any one of 1 to 4).

Thus, it may be thought that an operation is often executed outside the range of the button, that is, outside the display 18 or touch panel input unit 19, as described above. However, as illustrated in FIG. 12, by newly moving the button image to the detected operation position of the user, the operability of the touch panel input unit 19 can be secured.

In the above-described embodiment, as illustrated in FIG. 3, the selection and setup of the controller image are executed before the start of the game by the customization process. However, in the descriptions including descriptions of FIG. 4 to FIG. 11, the customization process of the selection and setup of the entire control image and the selection and setup of respective buttons, etc., which constitutes the controller image, may be executed at a proper time during the execution of the game.

As has been described above in detail, according to the embodiment, it is possible to realize an environment in which a smartphone or a tablet terminal, which is possessed by a general user, can be effectively used, and a game can be easily enjoyed, with a personal habit in operation of each user being taken into account.

In addition, in the embodiment, as described with reference to FIG. 7, a single drawing operation on a plurality of buttons, which are a plurality of neighboring operation elements, can be set as a successive operation of the plural buttons. It is thus possible to realize an operation by the controller with higher operability, taking the user's demand into account.

In the embodiment, as described with reference to FIG. 8, an operation on a range including an area between a plurality of buttons, which are a plurality of neighboring operation elements, can be set as a simultaneous operation of the plural buttons. It is thus possible to realize an operation by the controller with higher operability, taking the user's demand into account.

Furthermore, in the embodiment, as described with reference to FIG. 9, the range for determining the simultaneous operation can be arbitrarily set by the user himself/herself. It is thus possible to realize an operation by the controller with higher operability, reflecting the user's demand in executing the game.

In addition, in the embodiment, as described with reference to FIG. 10, the range for determining the simultaneous operation can be set based on the tendency in operation of the user. It is thus possible to realize an operation by the controller with higher operability, which is suited to each user in executing the game.

In the embodiment, as described with reference to FIG. 11, the position of the button simulating the analog stick, for which each user's preference, in particular, tends to occur, can arbitrarily be set by the user. It is thus possible to realize an operation by the controller with higher operability, taking the user's demand into account.

Although not described in the above embodiment, for example, in the case where the user executes an operation without viewing the controller image displayed on the display 18 of the smartphone Sn (n: any one of 1 to 4) in the course of operating the button simulating the analog stick having the position set by the user, it is thought that an operation is often executed outside the range of the button. Thus, the CPU 11 may detect the amount and direction of a displacement of the operation position, based on the output from the touch panel input unit 19, and to move and correct the position of the button simulating the analog stick, based on the detected amount and direction of displacement of the operation position.

Thereby, even when the user has mistaken an operation position of the button simulating the analog stick, without being aware of the mistake, it is possible to continue the game without uselessly interrupting the game or suffering a disadvantage in the game.

Besides, in the embodiment, as described with reference to FIG. 12, the operation position of the button simulating the analog stick is limited within the screen of the display 18. It is thus possible to avoid an operation error of the user, without degrading the operability of an operation on, in particular, a peripheral end portion of the touch panel input unit 19.

Although not described in the above embodiment, the condition of progress of the game may be associated with the condition for customization setup, for example, such that a specific customization process cannot be executed depending on the condition of progress of the game, for example, unless a specific item is obtained. Thereby, the capabilities of the game are enhanced and various game environments can be provided.

Second Embodiment

A game system according to a second embodiment of the present invention will now be described with reference to the accompanying drawings.

Figure 13:
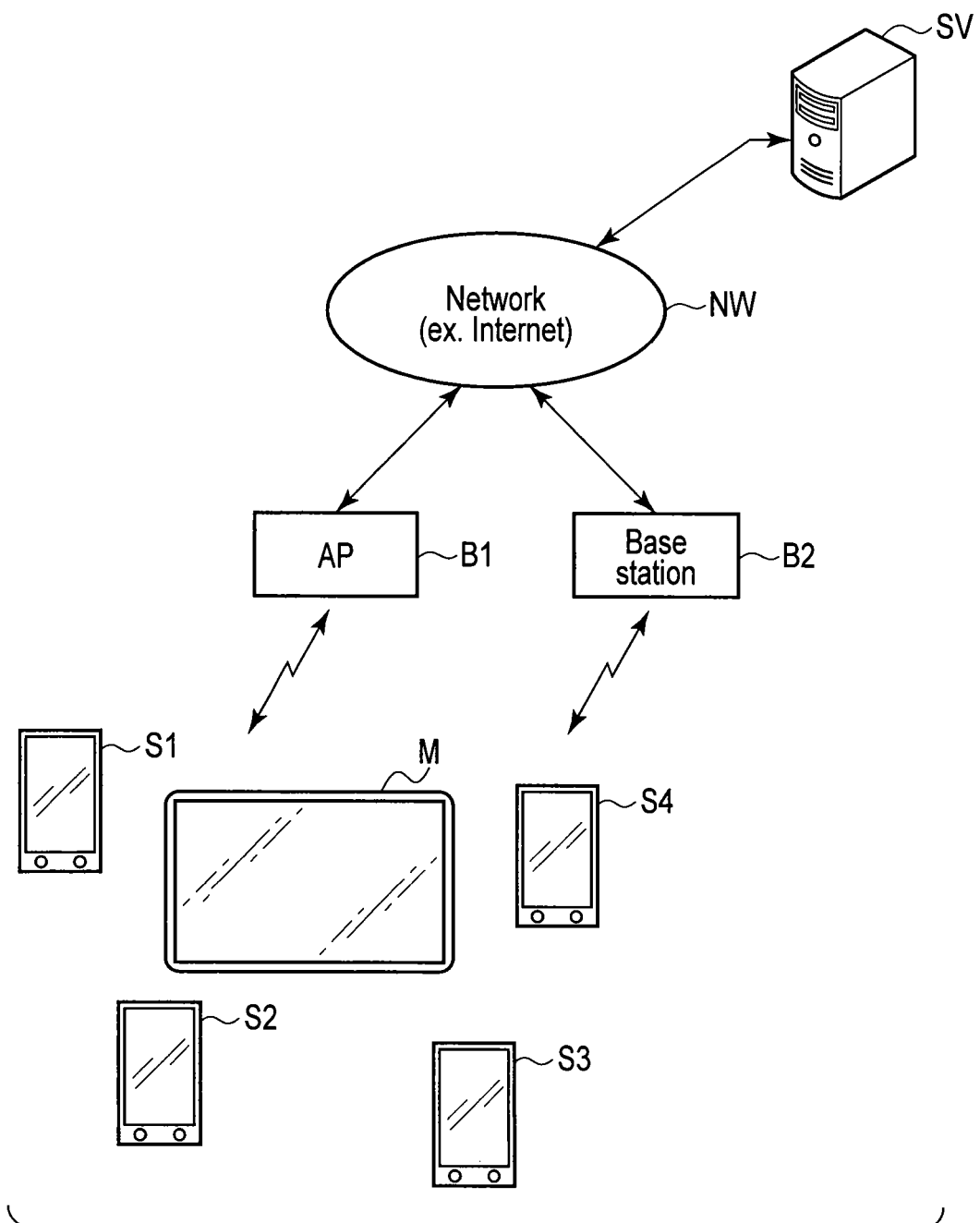
FIG. 13 is a view illustrating an example of an environment of realization of a game system according to a second embodiment of the invention.

FIG. 13 is a view for describing an example of a system environment according to the embodiment. In FIG. 13, a game is executed by a structure including a tablet terminal M, which functions as a shared device, and a plurality of smartphones, for example, four smartphones S1 to S4, which are operated by users. In this example, the tablet terminal M functions as a master device which becomes a "parent" in the course of the progress of the game. The tablet terminal M executes the progress of the game and the display of the game image in association with operations in the respective smartphones S1 to S4.

The tablet terminal M should desirably have a larger display screen than the smartphones S1 to S4, but the tablet terminal M may be a mobile terminal having the same configuration as the smartphones S1 to S4.

On the other hand, each of the smartphones S1 to S4 is a slave device which becomes a "child", and functions as a game controller which is operated by each user. Each smartphone, S1 to S4, displays an image of the game controller on its display, and transmits, upon accepting a user operation by an operation on the touch panel, a corresponding operation signal to the tablet terminal M.

The tablet terminal M and smartphones S1 to S4 are connected to a Web server apparatus SV over a network NW including the Internet, via an access point (AP) B1 or a nearby base station B2.

It is assumed that the functional hardware configuration of electronic circuits, which are common to the tablet terminal M and smartphones S1 to S4, is basically the same as that illustrated in FIG. 2. The parts necessary in the description below are denoted by like reference numerals, and the depiction and description of these parts are omitted.

It is also assumed that the hardware configuration of electric circuits of the Web server apparatus SV is the same as a general configuration, and the depiction and description thereof are omitted.

Next, the operation of the second embodiment is described.

FIG. 14 is a sequence chart illustrating process contents as a whole, which are executed during a game between the Web server apparatus SV which comprehensively controls the entirety of the game, the tablet terminal M that is a master device and the smartphones S1 to S4 that are slave devices.

It is assumed that a game, which is executed in the present system, is, for example, a general card game, in which the plural smartphones S1 to S4 execute necessary operations by turns according to a preset order. It is also assumed that the user of the smartphone, S1 to S4, which does not have its turn, merely views the condition of the game which is displayed on the tablet terminal M, and does not need to execute any operation.

The Web server apparatus SV during the game accepts reception of an operation signal corresponding to the user's operation from that terminal of the smartphones S1 to S4, which has its turn for an operation (step S201), and repeatedly determines whether the reception has occurred (step S202), thereby standing by for the reception of an operation signal from the terminal.

If it is determined that an operation signal has been received from the terminal of the smartphone, S1 to S4, which has its turn (Yes in step S202), the Web server apparatus SV executes a progress process of the game in accordance with the received operation signal (step S203), updates the data of a shared image for the tablet terminal M, and transmits the updated data of the shared image to the tablet terminal M, thereby causing the tablet terminal M to display the shared image (step S204).

The tablet terminal M always stands by for reception of an image from the Web server apparatus SV (step S301). At a time point when the image has been received, the tablet terminal M develops this image (step 302), and causes the display 18 to display the shared image (step S303). Then, the tablet terminal M returns to the process from step S301, thereby to receive the next image.

At this time, the Web server apparatus SV creates a standby image and transmits this standby image to the smartphones other than the smartphone Sn (n: any one of 1 to 4) which requires an operation in the next turn, and causes each smartphone to display the standby image (step S205).

Further, the Web server apparatus SV executes, with respect to the smartphone Sn (n: any one of 1 to 4) which requires an operation in the next turn, correction setup for an operation element such as a button to be operated, taking into account the history information of up to the previous operation signal (step S206), and transmits the data of the controller image including the operation element such as a corrected button to the smartphone Sn (step S207). The Web server apparatus SV returns to the process from step S201, thereby to respond to an operation on the operation element such as a button in the controller image.

On the other hand, the smartphone, S1 to S4, always stands by for reception of an image from the Web server apparatus SV (step S401). At a time point when the image has been received, the smartphone, S1 to S4, develops the image (step S402), and determines whether the standby turn comes next, according to whether the developed image is an image which does not require a corresponding operation (step S403).

If the standby turn is determined, the smartphone, S1 to S4, causes the display 18 to display the developed standby image (step S404), temporarily disables an input by a touch operation or the like on the touch panel input unit 19 to skip a useless input process, and returns to the process from step S401, thereby to stand by for the next turn.

If the turn requiring an operation, and not the standby turn, is determined in step S403, the smartphone Sn displays on the display 18 the received image data, that is, the controller image in which the position, size, etc. of the operation element, such as the button or the like, are customized based on the operation history thus far (step S405), and stands by for an operation which is to be executed (step S406).

Then, at a time point when an operation has been executed, based on a signal from the touch panel input unit 19, the smartphone Sn transmits an operation signal corresponding to this operation to the Web server apparatus SV (step S407), and returns to the process from step S401.

FIG. 15 is a view illustrating a case in which the states of, in particular, the tablet terminal M and smartphones S1 and S2 during the execution of the game are extracted and illustrated.

Part (A) of FIG. 15 illustrates a state in which the smartphone S1, which is operated by the user "Player A", has its turn of operation. In this case, the tablet terminal M displays on the display 18 a guide message "Turn of player A", and a shared image which is representative of the conditions of the respective players corresponding to the progress of the game at this time point.

On the other hand, the smartphone S1, which has its turn to require execution of an operation, displays, for example, a cross button B91 on a left end side of the screen in accordance with the controller image which has been sent from the Web server apparatus SV. It is assumed that the user has operated a "right" side part of the button B91, as indicated by an arrow A91.

At this time, the smartphone S2, which does not have its turn, displays an advertisement image WI1 as a standby image, which has been transmitted from the Web server apparatus SV, and disables a touch operation by the touch panel input unit 19.

Part (B) of FIG. 15 illustrates a state in which the operation by the smartphone S1 was then finished and the smartphone S2, which is operated by the user "Player B", has its turn. In this case, the tablet terminal M displays on the display 18 a guide message "Turn of player B", and a shared image which is representative of the conditions of the respective players corresponding to the progress of the game at this time point.

On the other hand, the smartphone S2, which has its turn to require execution of an operation, displays, for example, a cross button B92 on a left end side of the screen in accordance with the controller image which has been sent from the Web server apparatus SV. It is assumed that the user has operated a "right" side part of the button B92, as indicated by an arrow A92.

At this time, the smartphone S1, which has already finished its turn, displays an advertisement image W12 as a standby image, which has been transmitted from the Web server apparatus SV, and disables a touch operation by the touch panel input unit 19.

In the second embodiment, the description has been given of, by way of example, the case in which the terminal, which is other than the terminal that has its turn and which requires no operation on the game, is caused to display the advertisement image as the standby image. However, the present invention is not limited to this example, and it is possible to display, for instance, some other mini-game, a tutorial, a guide manual of a game, etc.

As has been described above in detail, according to the second embodiment, it is possible to realize an environment in which a smartphone or a tablet terminal, which is possessed by a general user, can be effectively used, and a game can be easily enjoyed, with a personal habit in operation of each user being taken into account.

In addition, in the second embodiment, when a game on a rotating basis, such as a card game, is executed, a terminal device in a standby state, which is other than a terminal device that has its turn, is given an image which is not directly related to the game, such as an advertisement image or an image of a game manual, as a standby image. Thereby, by making effective use of a system in which, unlike a closed system, images are provided by online from the Web server apparatus SW, it becomes possible to present various information, aside from the game, to the users, and to effectively use the standby time.

In each of the first and second embodiments, the case has been described that the game is performed by the tablet terminal M and, for example, four smartphones S1 to S4. However, if users participating in the game have at least information terminal devices having touch-panel-type displays, the same game environment can be realized, and there are no restrictions to the kinds of information terminal devices used by users, or the concrete contents of controller images.

The present invention is not limited to the above-described embodiments. In practice, various modifications may be made without departing from the spirit of the invention. In addition, the functions executed in the embodiments may be implemented by being properly combined as much as possible. The above-described embodiments include inventions in various stages, and various inventions can be derived from proper combinations of structural elements disclosed herein. For example, even if some structural elements in all the structural elements disclosed in the embodiments are omitted, if the advantageous effect can be obtained, the structure without such structural elements can be derived as an invention.

What is claimed is:

1. A non-transitory computer-readable medium including computer program instructions, which when executed by an electronic device, cause the electronic device to:
   identify a controller image which is used in a game;
   set at least one of a presence/absence of a function, a number, a size, a shape and a position, with respect to an operation object in the controller image;
   modify, in accordance with the setting, a state of the controller image that is used in the game and displayed on a display;
   identify an operation at a position on a touch panel that corresponds to a first object, as a first input to the first object;
   identify an operation at a position on the touch panel that corresponds to a second object, as a second input to the second object;
   receive a predetermined operation on the touch panel for designating both the first object and the second object, the predetermined operation specifying a range between the first object and the second object;
   generate an operation area responsive to receiving the predetermined operation, wherein the generated operation area includes a range not covered by the first object or the second object and includes a portion of the first object and a portion of the second object; and
   identify an operation at the generated operation area on the touch panel as a third input different from the first input and the second input.

2. The non-transitory computer-readable medium of claim 1, wherein
   the predetermined operation is a single drawing operation on a plurality of buttons, which are a plurality of neighboring operation objects, and the third input corresponds to a successive operation of the plurality of buttons.

3. The non-transitory computer-readable medium of claim 1, wherein
   the predetermined operation is an operation on a range including an area between a plurality of buttons, which are a plurality of neighboring operation objects, and the third input corresponds to a simultaneous operation of the plurality of buttons.

4. The non-transitory computer-readable medium of claim 3, wherein:
the range including the area between the plurality of buttons is arbitrarily settable.

5. The non-transitory computer-readable medium of claim 3, wherein:
the range including the area between the plurality of buttons is settable based on a simultaneous operation of the plurality of buttons during a predetermined period.

6. The non-transitory computer-readable medium of claim 1, wherein the computer program instructions cause the electronic device to:
set a position of an operation object which is representative of an analog stick.

7. The non-transitory computer-readable medium of claim 6, wherein the computer program instructions cause the electronic device to:
detect an amount and a direction of a displacement of an operation position on the operation object; and
move the position of the operation object based on the amount and the direction of the displacement of the operation position.

8. The non-transitory computer-readable medium of claim 6, wherein:
the position of the operation object is restricted in accordance with a display range of the display.

9. The non-transitory computer-readable medium of claim 1, wherein the computer program instructions cause the electronic device to:
restrict a condition of the setting in accordance with a condition of progress of the game.

10. A system for providing a game to a plurality of terminal devices which are connected via a network, the system comprising:
circuitry configured to
accept an operation for setting up a shared device configured to display an image for sharing, the shared device being included in the plurality of terminal devices:
accept information based on operation in a second terminal device other than the shared device;
cause the shared device to display a game image which reflects the accepted information based on the operation in the second terminal device and a content of the game;
transmit a controller image, which is used in the game, to the second terminal device to display the controller image;
set at least one of a presence/absence of a function, a number, a size, a shape and a position, with respect to an operation object in the controller image, based on an operation in the second terminal device;
modify, in accordance with the setting, a state of the controller image displayed on the display of the second terminal device, and an operation standard of the operation object corresponding to an input to a touch panel of the second terminal device;
identify an operation at a position on the touch panel that corresponds to a first object, as a first input to the first object;
identify an operation at a position on the touch panel that corresponds to a second object, as a second input to the second object;
receive a predetermined operation on the touch panel for designating both the first object and the second object, the predetermined operation specifying a range between the first object and the second object;
generate an operation area responsive to receiving the predetermined operation, wherein the generated operation area includes a range not covered by the first object or the second object and includes a portion of the first object and a portion of the second object; and
identify an operation at the generated operation area on the touch panel as a third input different from the first input and the second input.

11. The system of claim 10, wherein
the circuitry is configured to transmit, in accordance with progress of the game, a standby image for waiting for an operation, in place of the controller image used in the game, to the second terminal device to display the standby image.

12. An electronic device comprising:
circuitry configured to
identify a controller image which is used in a game;
set at least one of a presence/absence of a function, a number, a size, a shape and a position, with respect to an operation object in the controller image;
modify, in accordance with the setting, a state of the controller image that is used in the game and displayed on a display;
identify an operation at a position on a touch panel that corresponds to a first object, as a first input to the first object;
identify an operation at a position on the touch panel that corresponds to a second object, as a second input to the second object;
receive a predetermined operation on the touch panel for designating both the first object and the second object, the predetermined operation specifying a range between the first object and the second object;
generate an operation area responsive to receiving the predetermined operation, wherein the generated operation area includes a range not covered by the first object or the second object and includes a portion of the first object and a portion of the second object; and
identify an operation at the generated operation area on the touch panel as a third input different from the first input and the second input.

13. The system of claim 10, wherein:
the system is a server.

14. The system of claim 10, wherein the system comprises:
a server including the circuitry;
the shared device; and
the second terminal device.

15. A method performed by an electronic device, the method comprising:
identifying a controller image which is used in a game;
setting, by circuitry of the electronic device, at least one of a presence/absence of a function, a number, a size, a shape and a position, with respect to an operation object in the controller image;
modifying, in accordance with the setting, a state of the controller image that is used in the game and displayed on a display of the electronic device;
identifying an operation at a position on a touch panel that corresponds to a first object, as a first input to the first object;

identifying an operation at a position on the touch panel that corresponds to a second object, as a second input to the second object;

receiving a predetermined operation on the touch panel for designating both the first object and the second object, the predetermined operation specifying a range between the first object and the second object;

generating an operation area responsive to receiving the predetermined operation, wherein the generated operation area includes a range not covered by the first object or the second object and includes a portion of the first object and a portion of the second object; and identifying an operation at the generated operation area on the touch panel as a third input different from the first input and the second input.

16. The non-transitory computer-readable medium of claim 1, wherein the third input is an input to both of the first object and the second object.

17. The non-transitory computer-readable medium of claim 1, wherein the predetermined operation is a slide operation starting from outside the first object and the second object and passing through the first object and the second object.

18. The non-transitory computer-readable medium of claim 1, wherein the predetermined operation designates a range including a portion of the first object and a portion of the second object.

19. The non-transitory computer-readable medium of claim 1, the predetermined operation designates a plurality of positions including positions in the first object and the second object.

20. The non-transitory computer-readable medium of claim 1, wherein the predetermined operation is a drawing operation.

21. The non-transitory computer-readable medium of claim 1, wherein the predetermined operation is a single drawing operation by a finger over a range between the first object and the second object.

22. The non-transitory computer-readable medium of claim 1, wherein the operation area is newly generated responsive to receiving the predetermined operation, and the operation area does not exist before receiving the predetermined operation.

* * * * *